(12) United States Patent
Yuyama et al.

(10) Patent No.: US 6,830,161 B2
(45) Date of Patent: Dec. 14, 2004

(54) AUTOMATIC DISPENSER FOR INJECTION-CONTAINING MEMBERS

(75) Inventors: Shoji Yuyama, Osaka (JP); Tsuyoshi Kodama, Osaka (JP); Naoki Koike, Osaka (JP); Akitomi Kohama, Osaka (JP); Hiroshi Hashimoto, Osaka (JP); Masahiko Kasuya, Osaka (JP); Takayuki Fujikawa, Osaka (JP); Hiroyasu Hamada, Osaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 152 days.

(21) Appl. No.: 10/221,571

(22) PCT Filed: Mar. 15, 2001

(86) PCT No.: PCT/JP01/02036

§ 371 (c)(1),
(2), (4) Date: Sep. 13, 2002

(87) PCT Pub. No.: WO01/68484

PCT Pub. Date: Sep. 20, 2001

(65) Prior Publication Data

US 2003/0029882 A1 Feb. 13, 2003

(30) Foreign Application Priority Data

Mar. 16, 2000 (JP) .................................. 2000-74138
Mar. 23, 2000 (JP) .................................. 2000-82361

(51) Int. Cl.[7] ............................................. B23Q 7/04
(52) U.S. Cl. .................................................. 221/210
(58) Field of Search ......................................... 220/210

(56) References Cited

U.S. PATENT DOCUMENTS 4,513,878 A * 4/1985 Hartness et al. ............. 221/40
5,377,864 A * 1/1995 Blechl et al. .................. 221/2
6,006,946 A * 12/1999 Williams et al. ............... 221/9
6,039,209 A    3/2000 Yuyama et al.

FOREIGN PATENT DOCUMENTS

| JP | 56-64979 | 5/1981 |
|---|---|---|
| JP | 57-188708 | 11/1982 |
| JP | 61-206708 | 9/1986 |
| JP | 61-273345 | 12/1986 |
| JP | 62-12507 | 1/1987 |
| JP | 2-60648 | 3/1990 |
| JP | 2-311979 | 12/1990 |
| JP | 3-32012 | 3/1991 |
| JP | 3-56305 | 3/1991 |
| JP | 3-83701 | 4/1991 |
| JP | 3-88607 | 4/1991 |
| JP | 3-62786 | 6/1991 |
| JP | 3-97403 | 10/1991 |
| JP | 5-229660 | 9/1993 |
| JP | 6-293402 | 10/1994 |
| JP | 6-339883 | 12/1994 |
| JP | 7-2313 | 1/1995 |
| JP | 10-53305 | 2/1998 |
| JP | 10-83476 | 3/1998 |
| JP | 10-265037 | 10/1998 |
| JP | 11-59814 | 3/1999 |

* cited by examiner

Primary Examiner—Donald P. Walsh
Assistant Examiner—Kenneth W Bower
(74) Attorney, Agent, or Firm—Wenderoth, Lind & Ponack, L.L.P.

(57) ABSTRACT

In a casing, a grasp means and a movement means are provided. The movement means is driven and controlled by a control means with a container box being positioned in a specified position based on coordinate data of an injection drug housing member preinstalled in a coordinate data table for moving the injection drug housing member to a graspable position by the grasp means. Next, after grasped by the grasp means, the injection drug housing member is automatically transported to a desired position.

10 Claims, 47 Drawing Sheets

Fig. 1

Maximum loading condition table

| | Loading condition A | Loading condition B | Loading condition C |
|---|---|---|---|
| Soft bag | 2 | 1 | 0 |
| Bottle position a | 0 | 1 | 1 |
| Bottle position b | 0 | 1 | 1 |
| Bottle position c | 0 | 1 | 1 |

Loading condition A

Loading condition B

Loading condition C

|  | Prescription 1 | Prescription 2 | Prescription 3 | Prescription 4 | Prescription n |
|---|---|---|---|---|---|
| Soft bag | ○ |  | ○ ○ |  | ○ |
| Bottle position a | ○ | ○ |  | ○ | ○ |
| Bottle position b |  | ○ |  | ○ | ○ |
| Bottle position c |  |  |  | ○ | ○ |
|  |  |  | Full | Full | Full |

# AUTOMATIC DISPENSER FOR INJECTION-CONTAINING MEMBERS

TECHNICAL FIELD

The present invention relates to an automatic feeding device of injection drug housing members capable of taking out infusion bottles and the like containing injection drugs from a container box and feeding them automatically.

BACKGROUND ART

Conventionally, automatic feeding of light-weighted injection drugs such as ampoules has been implemented by the automatic feeding device disclosed, for example, in Japanese Patent Laid-Open Publication HEI No. 5-229660, Japanese Patent Laid-Open Publication HEI No. 10-83476, and Japanese Patent Laid-Open Publication HEI No. 10-265037.

However, the infusion bottle is large in weight as it is used for drip phleboclysis, and therefore automatic feeding is not attainable by the automatic feeding device.

Also, since the infusion bottle is usually used for drip phleboclysis in the state that a drug, particularly an injection drug in ampoule, vials and the like, is premixed in the infusion bottle, a device is demanded which enables automatic feeding of the infusion bottle as well as the ampoule and the like.

DISCLOSURE OF THE INVENTION

In order to solve the above problem of the present invention, an automatically feeding device of an injection drug housing member in a container box carried in a casing based on injection drug prescription data, comprising in the casing:

grasp means capable of grasping the injection drug housing member housed in the container box;

movement means for moving the grasp means;

takeout order setting means capable of setting takeout order of injection drug housing members in the container box, and control means for driving and controlling the movement means based on coordinate data of the injection drug housing member preinstalled in a coordinate data table in a state that the container box is positioned in a specified position and the takeout order set by the takeout order setting means so as to automatically transport the injection drug housing member to a specified position after the injection drug housing member being moved to a graspable position by the grasp means and grasped by the grasp means.

Preferably, the takeout order setting means is composed of indication means for indicating an operation screen at least having an order column.

The grasp means may be composed of an arm pawl for grasping a bottleneck of an infusion bottle, an arm support barrel for accommodating the arm pawl to prevent expansion thereof, and a retention mechanism capable of retaining the arm pawl in a state of being accommodated in the arm support barrel.

Preferably, the coordinate data of each infusion bottle in the container box preinstalled in the coordinate data table includes a margin value for adjusting a grasp position by the grasp means, which makes it possible to ensure grasping of the infusion bottle by the grasp means.

Preferably, when indication contents by the indication means are changed and installed data is duplicated thereby, a message is indicated.

Preferably stock management of the infusion bottle is conducted based on number of the infusion bottles taken out from the container box and the coordinate data table, which makes it possible to facilitate understanding of stock information of a necessary bottle.

Preferably, the injection drug housing member is a soft bag, and the grasp means has an elastic holding portion for holding a surface sheet of the soft bags raked up and stacked flat in the container box from both sides for grasping.

Preferably, there is provided a bucket for collecting an injection drug housing member carried out from the container box by the grasp means, and the control means prevents overloading of the injection drug housing member fed to the bucket by the grasp means based on a maximum loading condition determined in advance corresponding to a kind of the injection drug housing member.

Also, in order to solve the above problem of the present invention, an automatic feeding device of an injection drug housing member in a container box carried in a casing based on injection drug prescription data, comprising in the casing:

grasp means capable of grasping the injection drug housing member housed in the container box;

detecting means for detecting whether the injection drug housing member is grasped by the grasp means or not;

movement means for moving the grasp means;

an automatic storehouse for storing a plurality of the container boxes and automatically feeding an appropriate container box; and feeding means for automatically feeding appropriate injection drug housing members one by one based on coordinate data of the injection drug housing member preinstalled in the coordinate data table in a state that the container box automatically fed from the automatic storehouse is positioned in a specified position.

BRIEF DESCRIPTION OF THE DRAWINGS

FIG. 1 is a side view showing an automatic feeding device according to a first embodiment;

BEST MODE FOR CARRYING OUT THE INVENTION

First Embodiment

Figure 1:
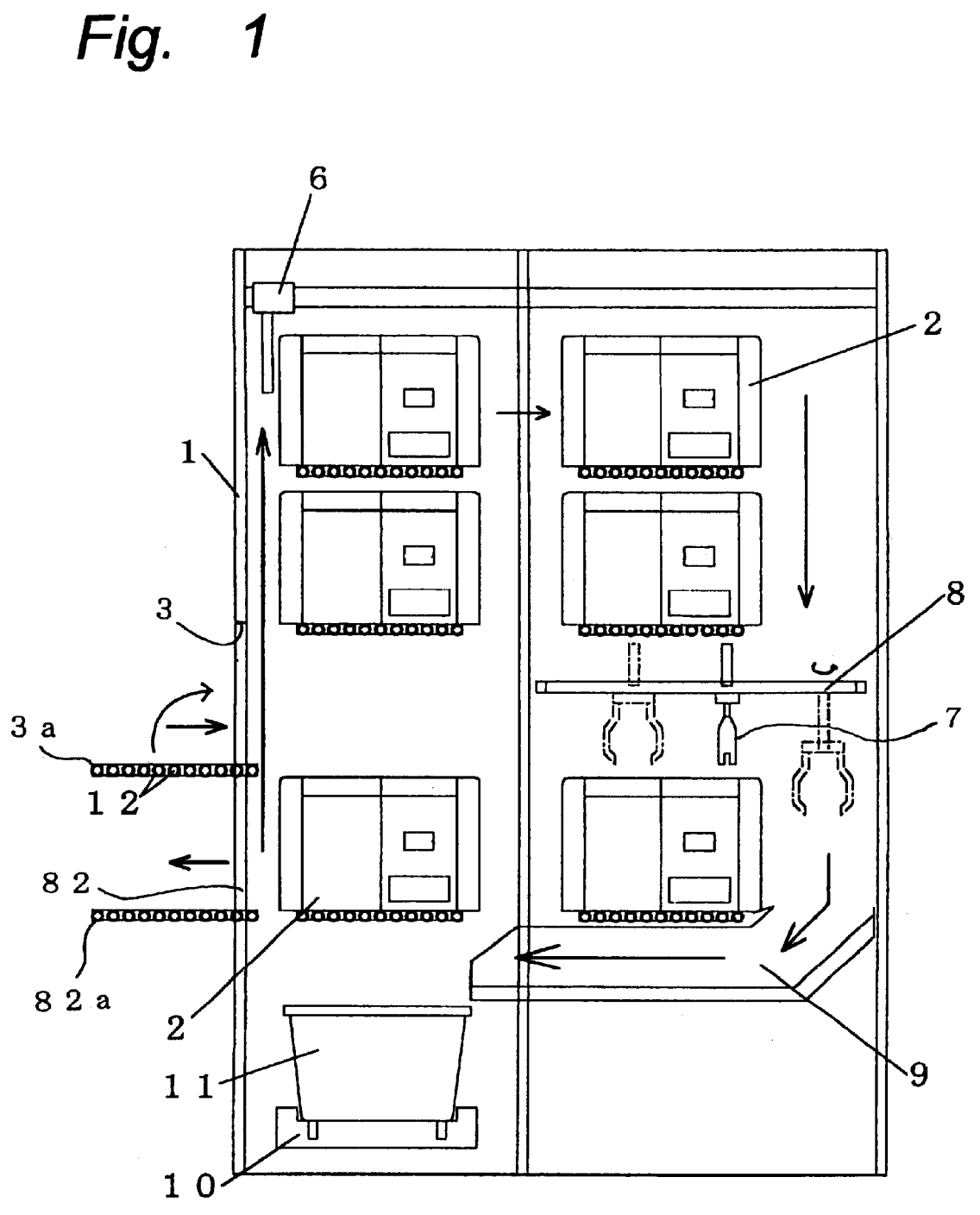
Figure 2:
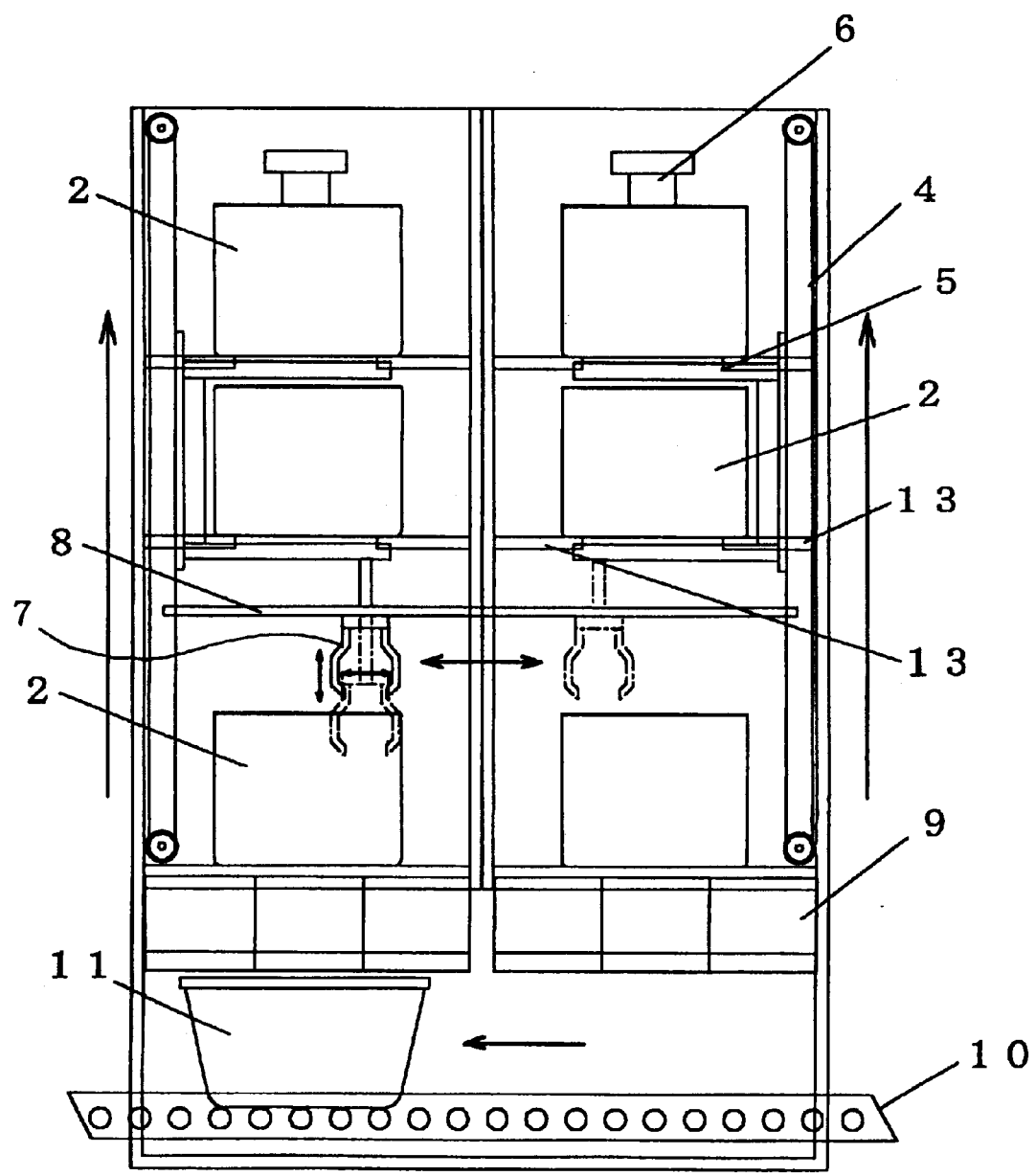
FIG. 2 is a front view of FIG. 1.
Figure 3:
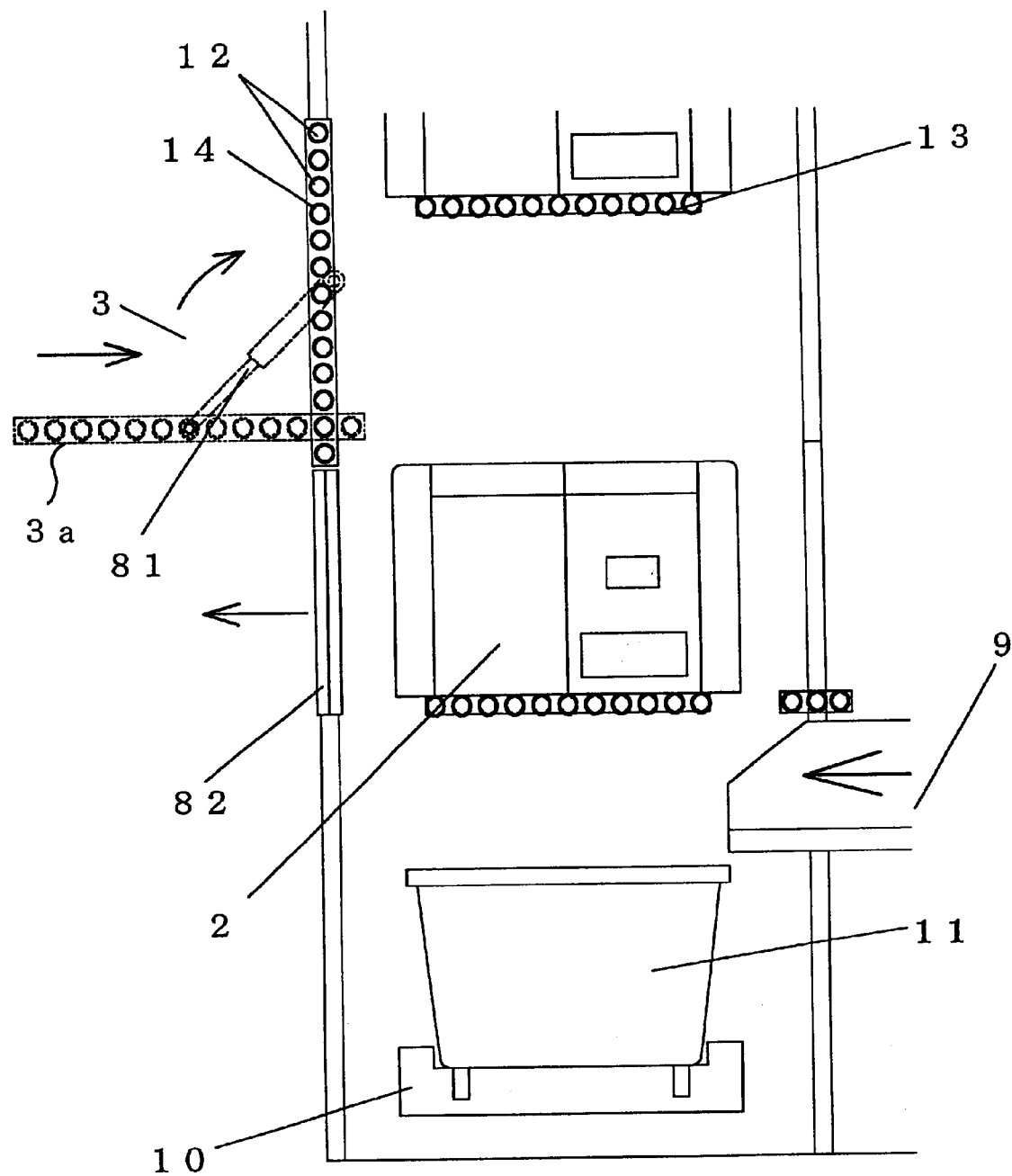
FIG. 3 is a detailed view showing the vicinity of a carry-in port of FIG. 1.

FIG. 1 and FIG. 2 show an automatic feeding device of an infusion bottle that is an injection drug housing member.

The automatic feeding device automatically feeds an infusion bottle 60 in a container box 2 carried in a casing 1 by using an infeed lift 4, a fork unit 5, a slide unit 6, a grasp portion 7, a movement unit 8, an input reserving portion 9, a bucket transportation line 10 and the like.

The casing 1 has a carry-in port 3 and a carry-out port 82 formed on the front side. The carry-in port 3 and the carry-out port 82 are each provided with conveyers 3a and 82a having a plurality of rollers 12 dispused in parallel. Each conveyer 3a and 82a is rotatably supported by a gas shock absorber 81, and is positioned in horizontal carry-in and carry-out positions and a vertical closing position. The conveyer 3a supported by the gas shock absorber 81 makes it possible to support even a heavy-weighted container box 2 containing an infusion bottle 60 in a stable state. Consequently, upper face opening operation of the container box 2 may be conducted in a carry-in position. It is noted that the container box 2 being carried in the casing 1 from the carry-in port 3 is detected by an unshown sensor.

Figure 4A:
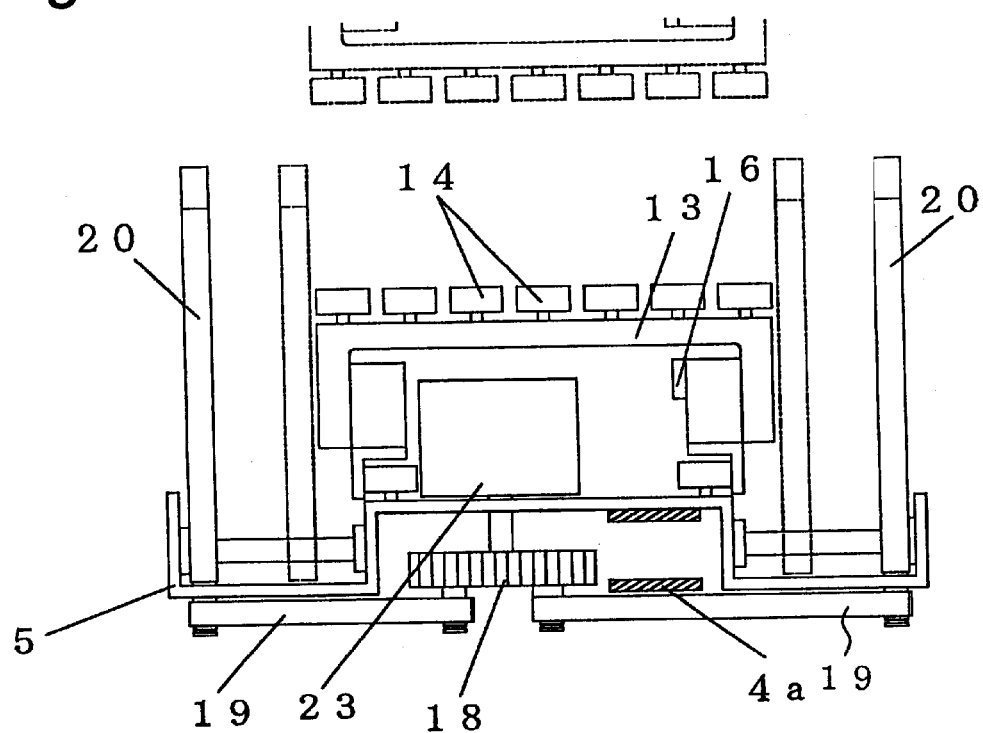
FIG. 4A is a plan view of a fork unit.
Figure 4B:
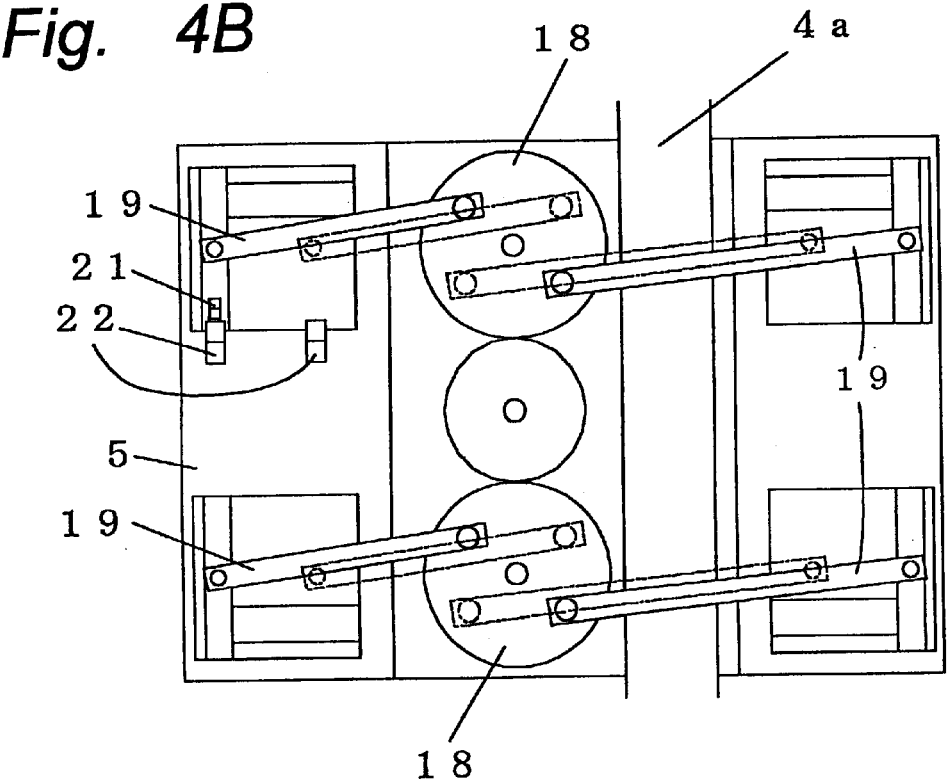
FIG. 4B is a bottom view of FIG. 4A.
Figure 5A:
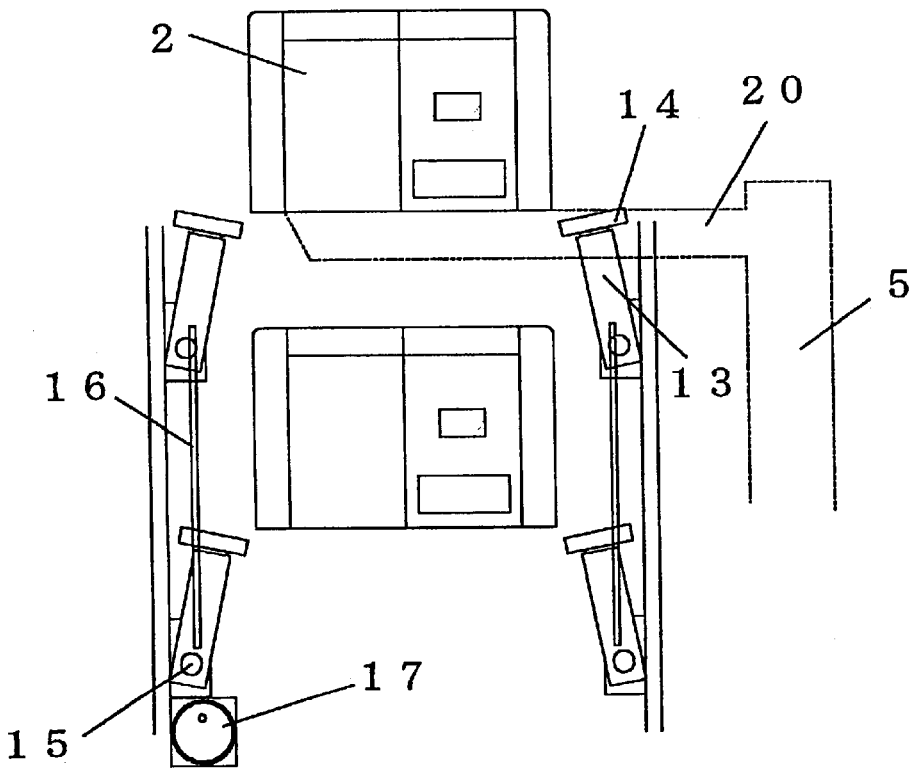
FIG. 5A is a detailed partial view showing a support member in the state of being rotated to a relief position.
Figure 5B:
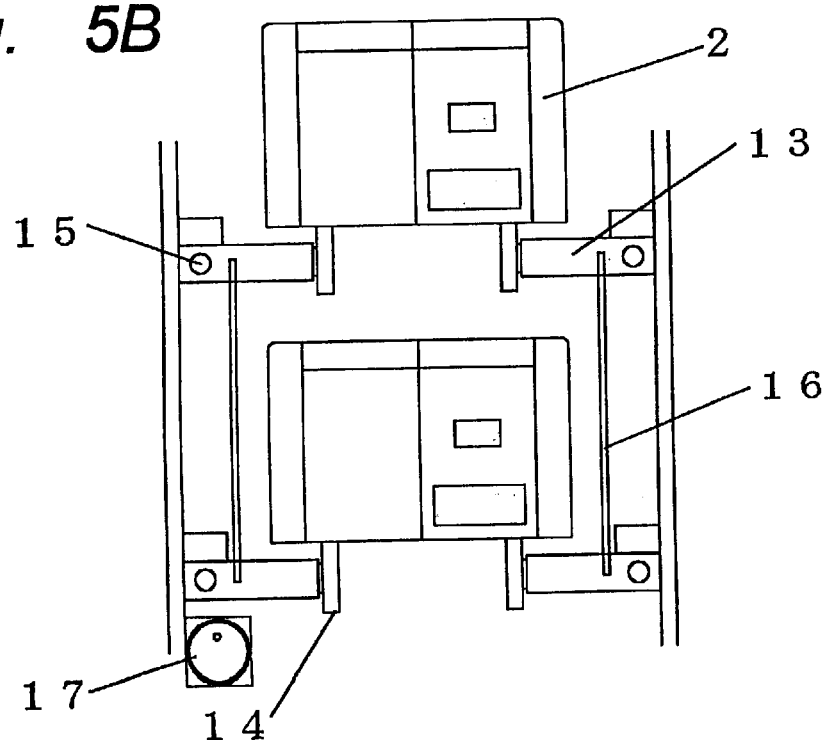
FIG. 5B is a detailed partial view showing the support member of FIG. 5A in the state of being rotated to a support position.

Inside the casing 1, as shown in FIG. 4 and FIG. 5, there is provided a support member 13 having a plurality of rollers 14 for supporting both lower sides of the container box 2 in each of a pair of upper and lower racks that is disposed backward and forward in vertical direction. The support member 13 is rotated as a pair of upper and lower racks via a coupling rod 16 to a relief position in approximately vertical direction shown in FIG. 5(a) and to a support position in horizontal direction shown in FIG. 5(b) by driving of a motor 17.

The infeed lift 4 is structured such that a belt is hung over a pair of rollers disposed vertically on the both sides of the casing, in which the rollers are rotated by driving of an unshown motor to circulate the belt.

The fork unit 5, as shown in FIG. 4, is provided with a fork 20 disposed in upper and lower two rows, and fixed to a belt of the infeed lift 4. Space between the forks 20 is adjusted by driving of a motor 23 via a driven gear 18 and a connecting shaft 19. The fork 20 is provided with a protrusion 21, which is detected by a sensor 22 provided in two parts in width direction. Accordingly, the motor 23 is driven and controlled, and the fork is positioned in a narrow lifting position and a wide relief position.

Figure 6A:
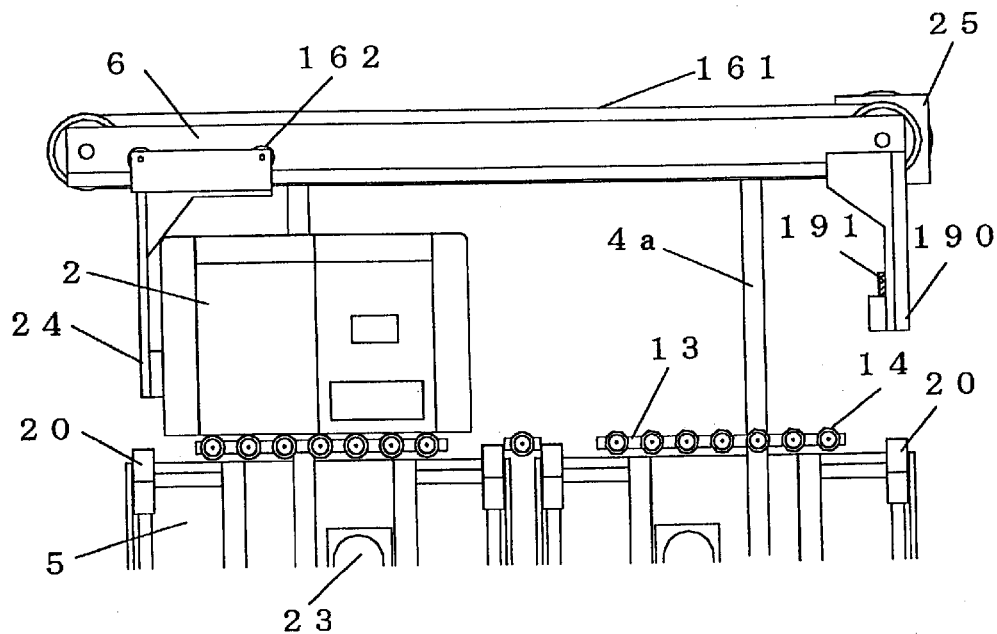
FIG. 6A is a detailed view showing the container box before being transported by a slide unit.
Figure 6B:
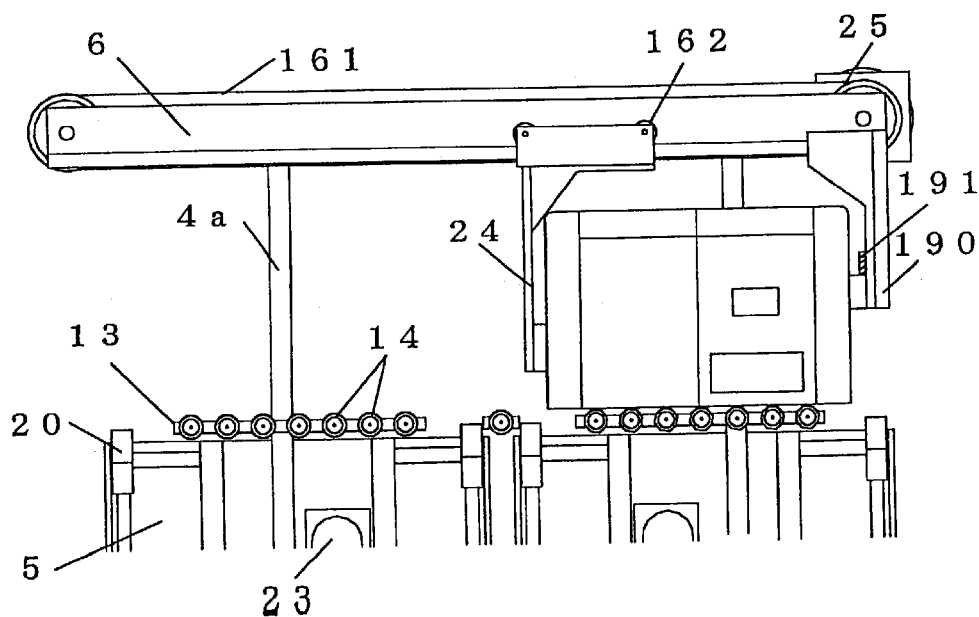
FIG. 6B is a detailed view showing the container box after being transported by the slide unit.

The slide unit 6, as shown in FIG. 6, is provided with an extrusion plate 24 slidably provided via a guide roller 162 on a rail extending in horizontal forward and backward direction. The extrusion plate 24 is secured to a timing belt 161 hung over a pulley on the both sides of the drawing, and is reciprocally moved between a forward position and a backward position of the casing 1 by reciprocal rotational driving of a motor 25. On the rear side of the casing 1, there is provided a far end plate 190 that comes into contact with the container box 2 transferred by the extrusion plate 24 for positioning. The far end plate 190 has a sensor 191, which detects the transferred container box 2. It is noted that return of the extrusion plate 24 to the forward position is detected by an unshown sensor.

The grasp portion 7, as shown in FIG. 8, has a pair of arm pawls 39 disposed on the lower end portion of an arm axis 38 that vertically slides inside an arm support barrel 37. The upper portion of the arm axis 38 has a rectangle cross section, and a support plate 44 is slidably provided so as to cover the upper portion. On the support plate 44, there is formed a guide groove 44a on which a guide protruding axis 43 provided vertically on the arm axis 38 slides. Also, on the surface of the support plate 44, there is provided a guide control plate 45 rotatable around a rotation axis 46. The guide control plate 45 has an approximately J-shaped engagement portion 45a formed on the lower end portion, and a falling guide portion 45b is formed on an inner verge portion thereof. The falling guide portion has an inclined face for guiding the guide protruding axis 43 engaged with the engagement portion 45a from the engagement portion 45a to the guide control plate 45. Above the guide control plate 45, there is provided a spring 48. The spring 48 presses the guide control plate 45 against the support plate 44 clockwise around the rotation axis 46 in FIG. 8, while pressing the arm axis 38 downward. Also, on the lower end portion of the arm axis 38, there is provided a pair of arm pawls 39 individually rotatable around a rotation axis 40. The arm pawl 39 is pressed so as to be expanded by a pressing spring 41 provided inside thereof. Between the arm pawls 39, there is provided a bottle top supporting portion 42 that comes into contact with the upper end portion of the infusion bottle. It is noted that the upper portion of the arm support barrel 37 is attached to the Z-axis direction slide axis 35.

Figure 7:
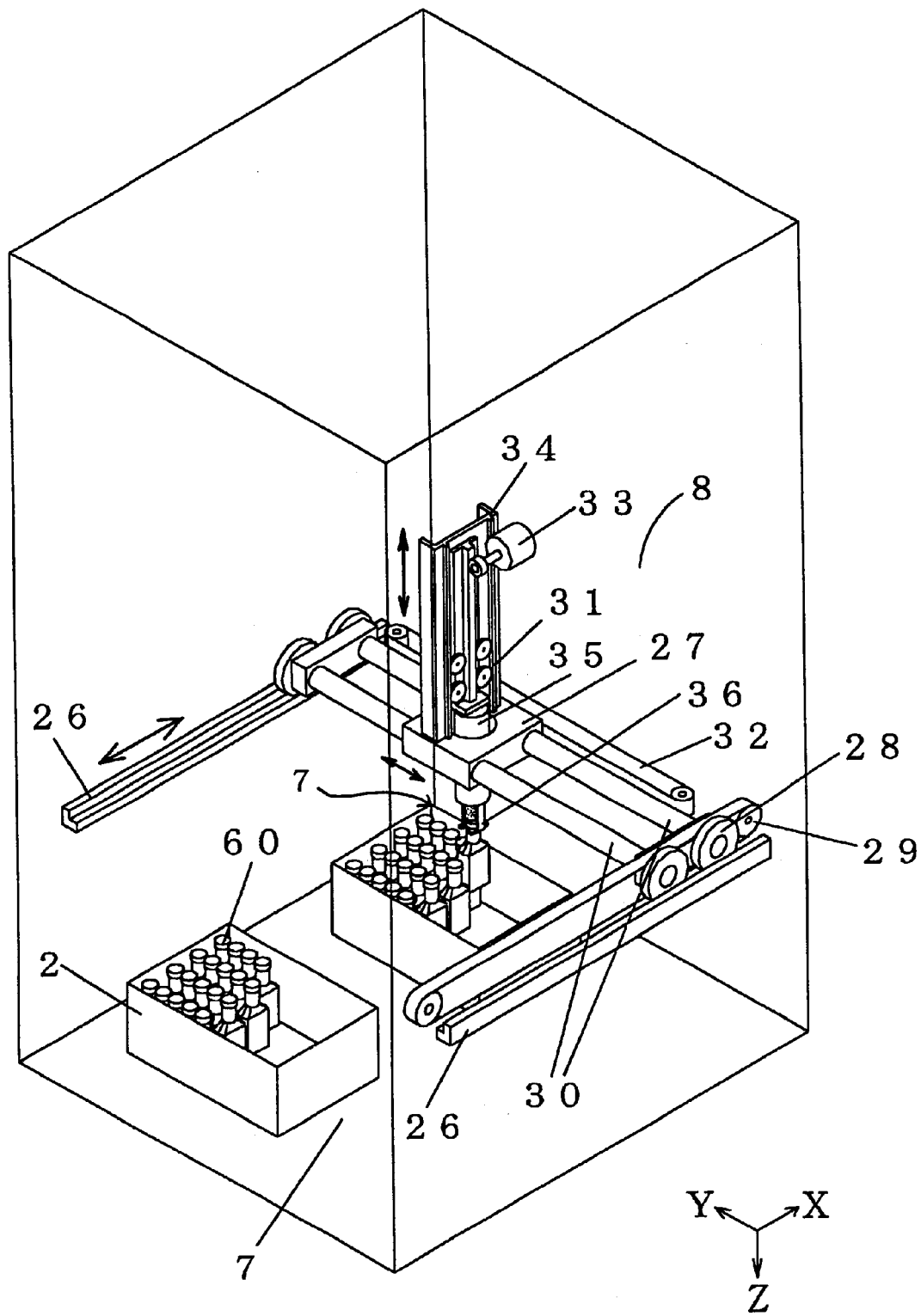
FIG. 7 is a schematic perspective view showing a grasp portion and a movement unit of FIG. 1.
Figure 8A:
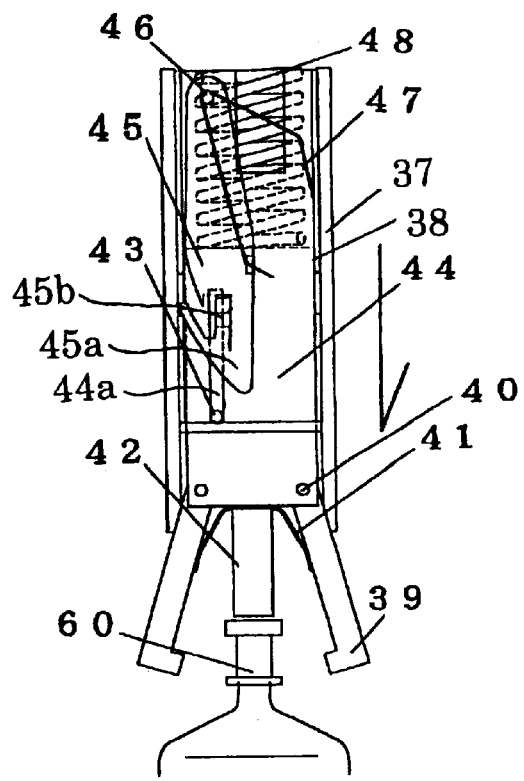
FIG. 8A is a view showing the bottleneck of an infusion bottle before being grasped by an arm pawl of the grasp portion.
Figure 8B:
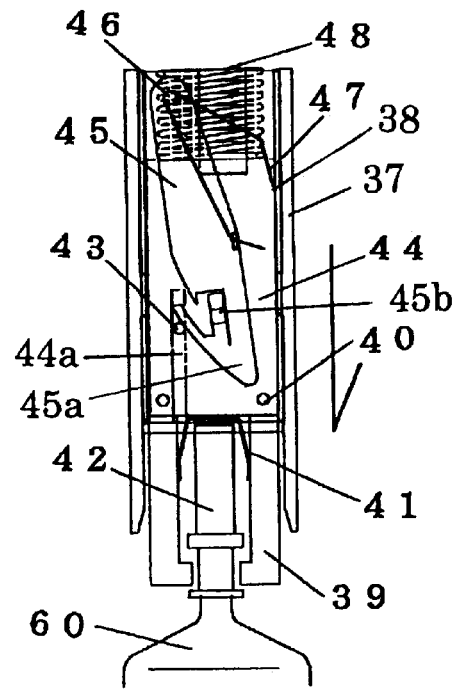
FIG. 8B is a view showing the grasp portion in the state of being lowered from the state of FIG. 8A so as to slide a guide protruding axis on a guide groove and rotate a guide control plate.
Figure 8C:
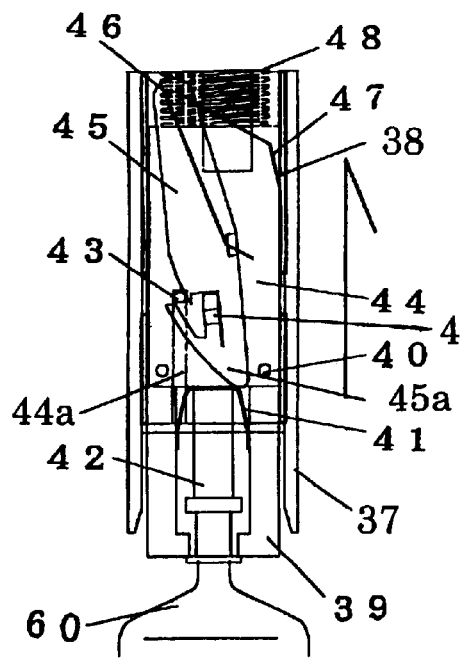
FIG. 8C is a view showing the grasp portion in the state of being further lowered from the state of FIG. 8B so as to move the guide protruding axis to the uppermost portion of the guide groove.
Figure 8D:
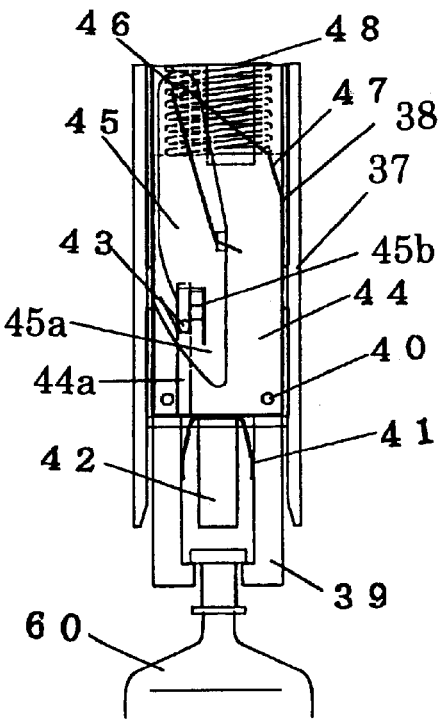
FIG. 8D is a view showing the grasp portion in the state of being raised from the state of FIG. 8C so as to grasp the bottleneck of an infusion bottle by an arm pawl.
Figure 9A:
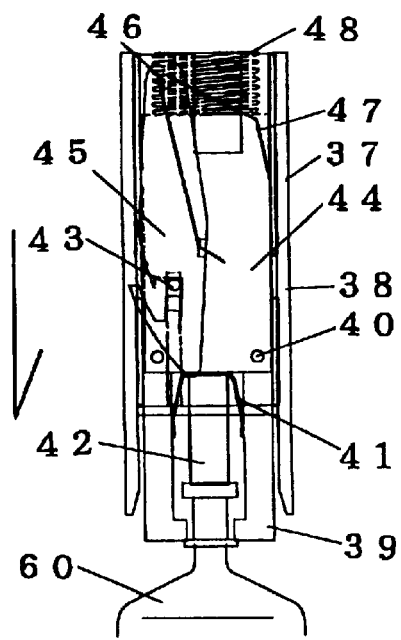
FIG. 9A is a view showing the grasp portion in the state of being lowered from the state of FIG. 8D so as to move the guide protruding axis to a falling guide portion.
Figure 9B:
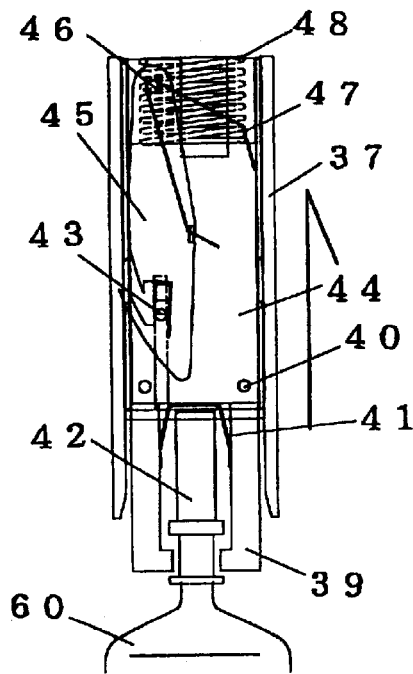
FIG. 9B is a view showing the grasp portion in the state of being raised from the state of FIG. 9A.
Figure 9C:
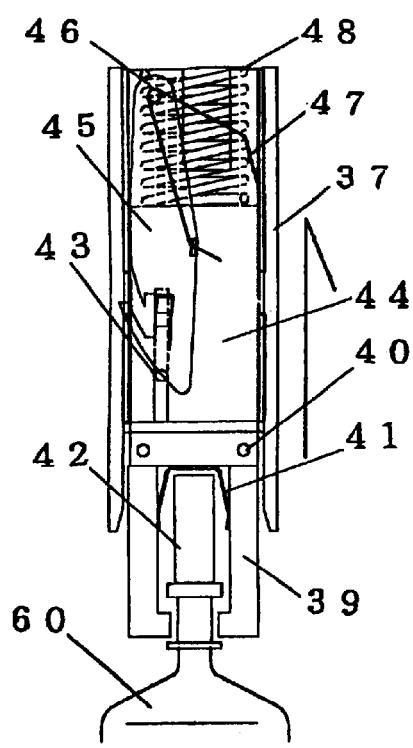
FIG. 9C is a view showing the grasp portion in the state of being further raised from FIG. 9B.
Figure 9D:
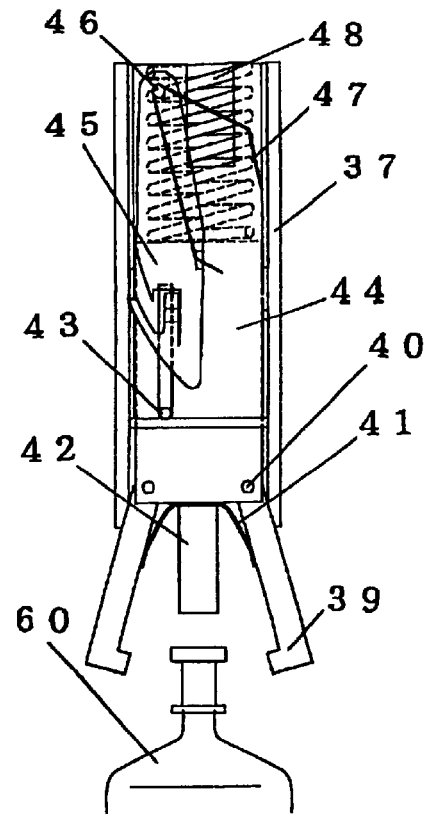
FIG. 9D is a view showing the grasp portion in the state of further raised form FIG. 9C so as to release the arm pawl and take it away from the bottleneck of an infusion bottle.

As shown in FIG. 7, the movement unit 8 is capable of moving the grasp portion 7 in X axis, Y axis, and Z axis direction. More particularly, the grasp portion 7 is held by a Y-axis direction slide unit 27 that is capable of reciprocating in Y axis direction along two slide rails 30. The Y-axis direction slide unit 27 reciprocates in Y axis direction by driving forces of an unshown motor transmitted via a belt 32. The slide rail 30 reciprocates in X axis direction by driving forces of an unshown motor transmitted via a belt 29, which rotates a roller 28 provided on the both end portions on a guide rail 26. The Y-axis direction slide unit 27 is provided with a Z-axis direction slide unit 31. The Z-axis direction slide unit 31 slidably supports the arm axis 38 of the grasp portion 7 via a plurality of rollers between a pair of slide rails 34 disposed in parallel along Z axis. A pinion provided on the rotation axis of a motor 33 gears with a rack formed on the arm axis 38 which raises and lowers the arm pawls 39 via the arm axis 38.

Figure 42:
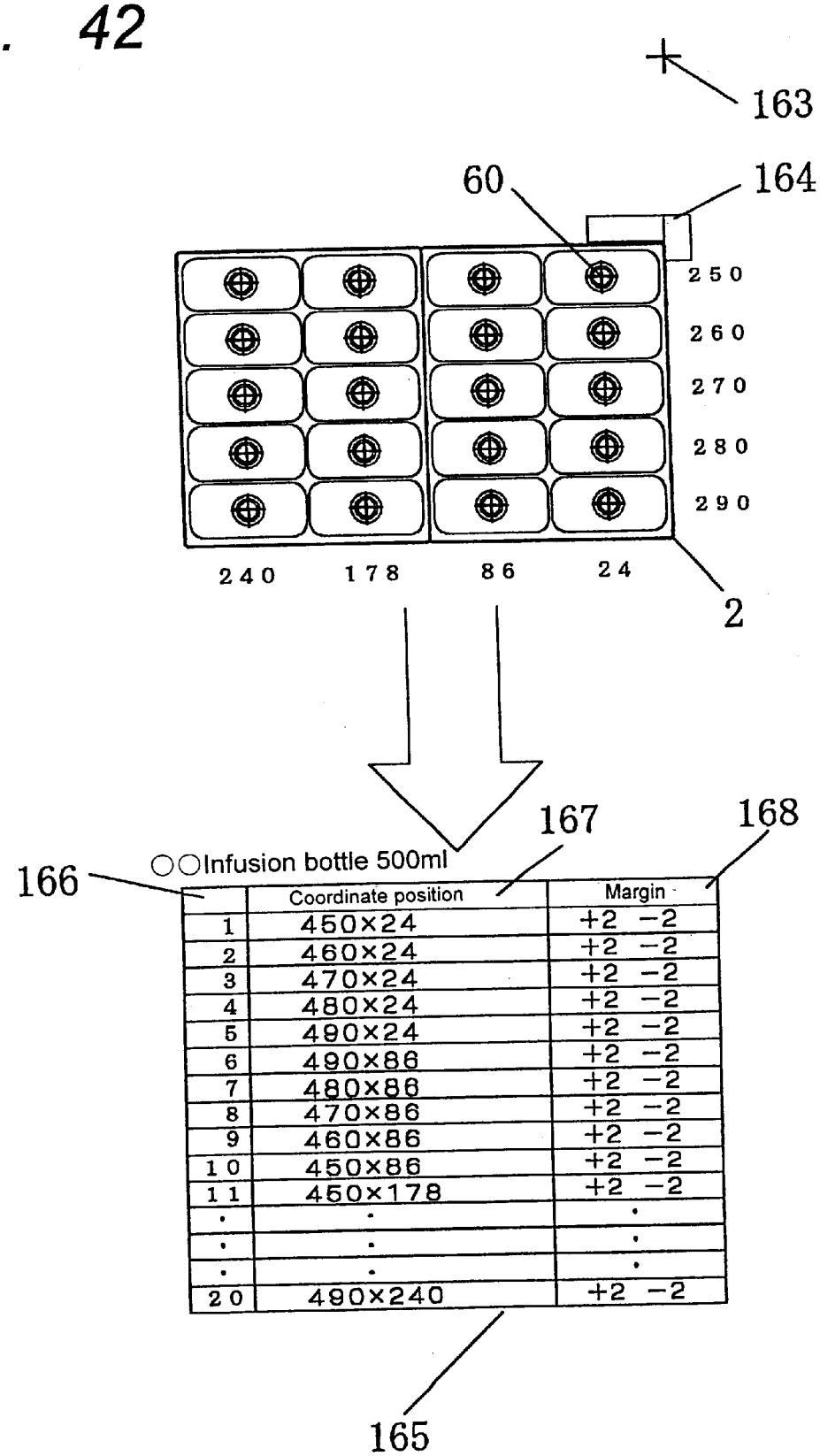
FIG. 42 is a view showing a coordinate position and coordinate data of an infusion bottle in the container box.

Driving control of the movement unit 8 is performed based on preinstalled coordinate data. More particularly, as the coordinate data, there are installed as shown in a bottle position coordinate master 165 of FIG. 42, coordinates (X, Y, Z) of an infusion bottle 60 from an origin 163 and a coordinate variation of a bottleneck caused by movement and displacement inside the container box 2, i.e., a margin value 168 corresponding to takeout order No. 166. Based on the coordinate data, driving control of the movement unit 8 is executed so as to move the grasp portion 7. It is noted that the coordinate data of only part of the infusion bottles 60 may be used and the position of other infusion bottles 60 may be identified from data of relative positions from the infusion bottles having the coordinate data. Also, a sensor may be provided on the end of the grasp portion 7 for directly detecting the upper portion of the infusion bottle 60.

The takeout order No. 166 of the bottle position coordinate master 165 is associated with a stock state table storing data on the presence of the bottle 60 stored in the container box 2, that is the data to indicate whether or not the bottle is present in an appropriate coordinate.

Figure 43:
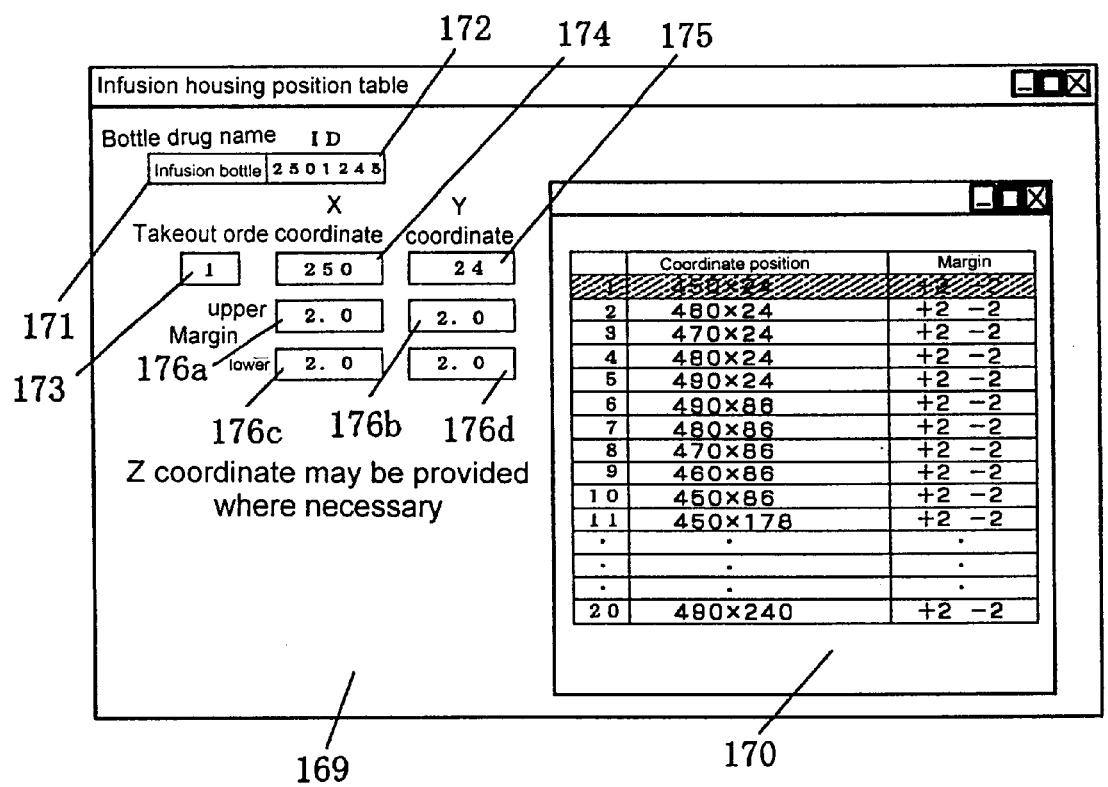
FIG. 43 is a view showing an operation screen of a bottle position coordinate master.

Each value in the battle position coordinate master 165 is changeable from the operation screen shown in FIG. 43.

FIG. 43 shows an input change screen 169 and an installation screen 170. In the input change screen 169, a drug name corresponding to the installation screen 170 is indicated in a name column 171, while ID number corresponding to the drug name is indicated in an ID indication column 172. In an order column 173, an X coordinate 174, a Y coordinate 175, and margin setting columns 176a to 175d, currently installed respective numerical value is indicated when a cursor is moved to a desired position of the takeout order No. 166 on the installation screen 170 or the desired position is clicked by the mouse. For example, when the cursor is moved to the order column 173 of the takeout order, and the numerical value therein is changed from 1 to 5 and registered, the registered coordinate order is changed to the fifth. If the takeout order is duplicated, there is indicated an error message informing duplication of the takeout order at the time of changing the takeout order (at the time of renewing registration). Therefore, efficient takeout method is settable for each infusion bottle. It is noted that the coordinate (Z) data may be set changeable where necessary.

An input reserving portion 9 is structured by a pathway connecting the rear side of the support member 13 positioned in the lower rack on the backward lower portion and the bucket transportation line 10 on the forward lower portion. The input reserving portion 9 is capable of reserving a plurality of infusion bottles 60 grasped from the container box 2 and transported to the rear side by driving of the grasp portion 7 and the movement unit.

The bucket transportation line 10 transports a bucket 11, which holds infusion bottles 60 sequentially inputted from the input reserving portion 9, to left side in FIG. 2. It is noted that the bucket 11 is sequentially fed from a bucket lifter 104 (see FIG. 46) as described later.

Next description discusses operation of the above-structured automatic feeding device of an injection drug housing member.

The gas shock absorber 81 is driven to rotate a conveyer a to a horizontal carry-in position to mount the optical fiber 2. Here, the container box 2 is carried in the casing 1 with the upper face of the container box 2 being opened. At this point, the support member 13 is rotated in horizontal direction so as to prepare for supporting the carried-in container box 2. Whether or not the container box 2 is completely carried in the casing 1 is detected by a sensor or the like. If the container box 2 is detected to be carried in, the motor 23 is driven to move the fork 20 to an inside lifting position. Then, the motor 17 is driven to rotate the support member 13 to an approximately vertical relief position, where the infeed lift 4 is driven to raise the fork 20 for uplifting the container box 2. The fork 20 is raised till the container box 2 passed through the immediately above support member 13, and at the position where rotation thereof will not be disturbed, the fork 20 is tentatively stopped and then again lowered after the support member 13 is rotated to a support position, which enables the support member 13 to support the container box 2. Hereinafter, the container box 2 is sequentially transferred to the upper support member 13 in the same way. The container box 2 supported by the forward uppermost support member 13 is transferred to the backward uppermost support member 13 by the extrusion plate 24 of the slide unit 6. Then, the container box 2 transferred to the backward uppermost support member 13 is sequentially transferred downward by the operation opposite to the operation described above. The container box 2 is always positioned in the same position (takeout position) by a position detection member 164 in the state of being supported by the backward lowermost support member 13 of the casing 1.

Figure 44:
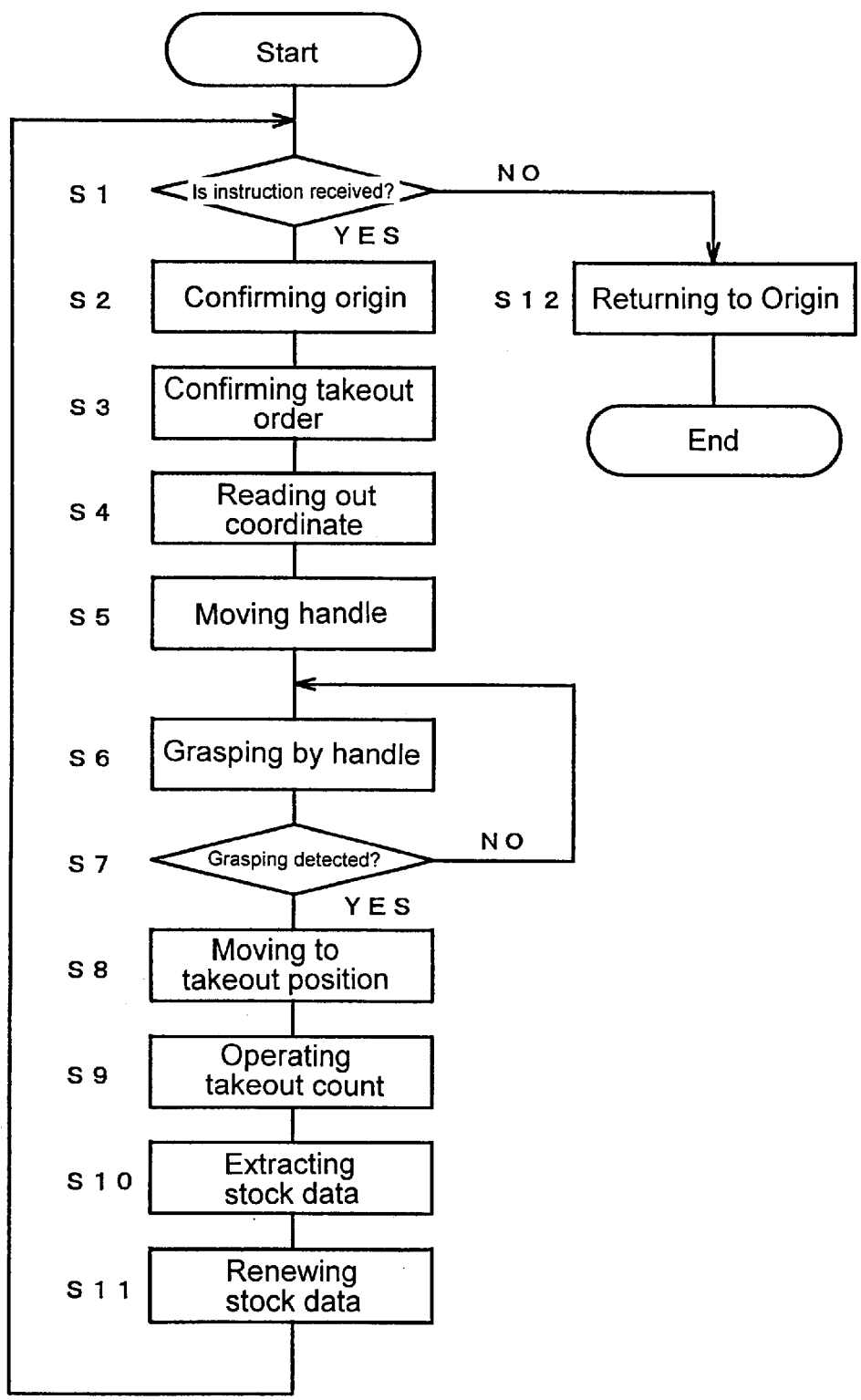
FIG. 44 is a flow chart showing operation of taking out an infusion bottle from the container box in the automatic feeding device according to the first embodiment.

Description will be given of the operation of taking out the infusion bottle 60 from the container box 2 with reference to the flow chart of FIG. 44.

First, it is determined whether or not a takeout instruction is received (step S1). If the takeout instruction is received, first the origin of the grasp portion 7 is confirmed (step S2). Then, a top coordinate enabling takeout of the infusion bottle is confirmed based on preinstalled coordinate data (step S3), and the coordinate data (including a margin value) is read out (step S4). Next, the movement unit 8 is driven and controlled to move the grasp portion 7 to the top coordinate (step S5), and the bottleneck of the infusion bottle 60 is grasped by the arm pawls 39 (step S6).

In the grasping operation by the arm pawls 39, first as shown in FIG. 8(1), a Z-axis direction slide axis 35 is lowered with the arm pawls 39 being expanded, so that the upper end portion of the infusion bottle 60 is brought into contact with a support member 42. Consequently as shown in FIG. 8(2), the arm axis 38 is inserted into the arm support barrel 37, by which the end of the arm pawl 39 comes close to grasp the bottleneck of the infusion bottle 60. Here, the guide protruding axis 43 is raised along a guide groove of the support plate 44 and is brought into contact with the outer verge of the engagement portion 45a, which rotates the guide control plate 45 around the rotation axis 46 counterclockwise in FIG. 8. Further, lowering the Z-axis direction slide axis 35 engages the guide protruding axis 43 with the engaging portion as shown in FIG. 8(3). Here, by an unshown sensor provided on the grasp portion 7, the presence of the infusion bottle 60 is detected (step S7). If the infusion bottle is not detected by the sensor, the procedure returns to the step S6 to re-execute grasping operation. In this casing, in the range of the margin value, the coordinate for moving the grasp portion 7 may be fine-tuned for improving grasping accuracy. It is also possible to set the procedure to shift to the grasping operation of a next infusion bottle 60 when the grasping operation is failed 5 times in a row.

If the infusion bottle 60 is grasped by the grasp portion 7, the movement unit 8 is driven and controlled to raise the Z-axis direction slide axis 35. As shown in FIG. 8(4), the guide protruding axis 43 is engaged with the engagement portion 45a, so that the grasped state by the arm pawls 39 is maintained and the infusion bottle 60 is uplifted. The infusion bottle is transferred to the takeout position, i.e., the input reserving portion 9, where the infusion bottle grasped by the grasp portion 7 is released (step S8).

For releasing the grasped bottle, the Z-axis direction slide axis 35 is lowered so as to press the bottom of the bottle against the input reserving portion 9. Consequently as shown in FIGS. 9(1) to 9(3), the guide protruding axis 43 moves on the falling guide portion 45b of the guide control plate 45, and falls from the engagement portion 45a. As a result as shown in FIG. 9(4), the arm pawls 39 are released to move the infusion bottle 60 to the input reserving portion 9.

When the infusion bottle 60 is transported to the input reserving portion 9, the stock data corresponding to the takeout order No. 166 is received (step S9), and number of currently delivered bottles corresponding to the coordinate position is subtracted (step S10). Then the stock data is renewed (step S11), and the procedure returns to the step S1 for repeating the processing as long as the takeout instruction is received. After that, if the takeout instruction is cleared, the grasp portion 7 is returned to the origin and entered into a standby state till a takeout instruction is generated (step S12).

Figure 10:
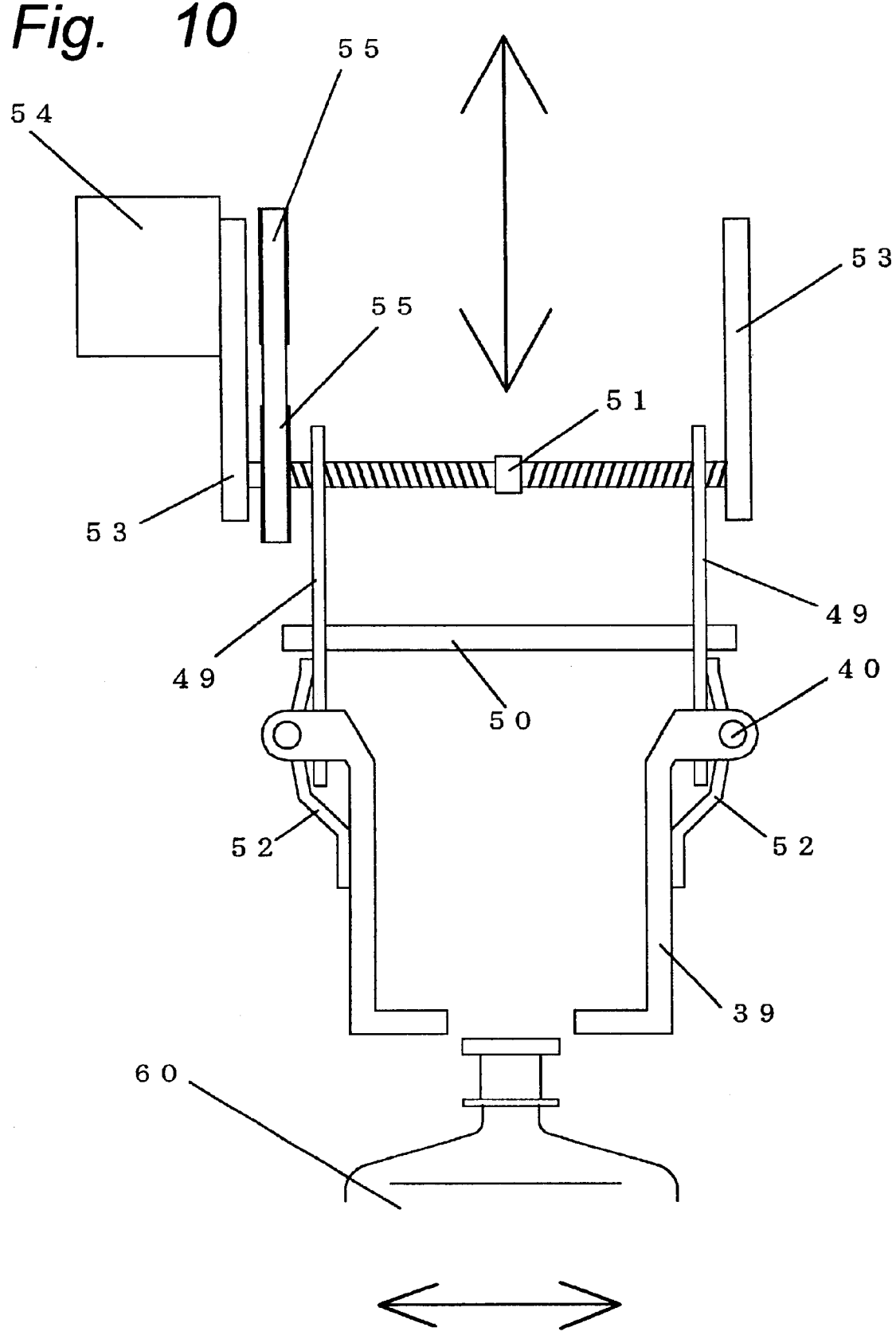
FIG. 10 is a detailed view showing a grasp portion of an automatic feeding device according to a second embodiment.

Although in the first embodiment, the grasp portion 7 is structured as shown in FIG. 8 and FIG. 9, the structure of the lower part of the Z-axis direction slide axis 35 (see FIG. 7) may be changed as shown in FIG. 10.

More particularly, on the lower end portion of the Z-axis direction slide axis 35, there are disposed opposed bearing support members 53. A screw member 51 is rotatably provided on the bearing support member 53. An opening and closing support plate 49 is attached to the screw member 51, which is rotated to adjust space between the opening and closing support plates 49. On the opening and closing support plates 49, there are provided arm pawls 39 rotatable around a rotation axis 40. The arm pawls 39 are pressed by a plate spring 52 so that the end portions are close to each other for holding the bottleneck of the infusion bottle 60 therebetween.

Figure 45:
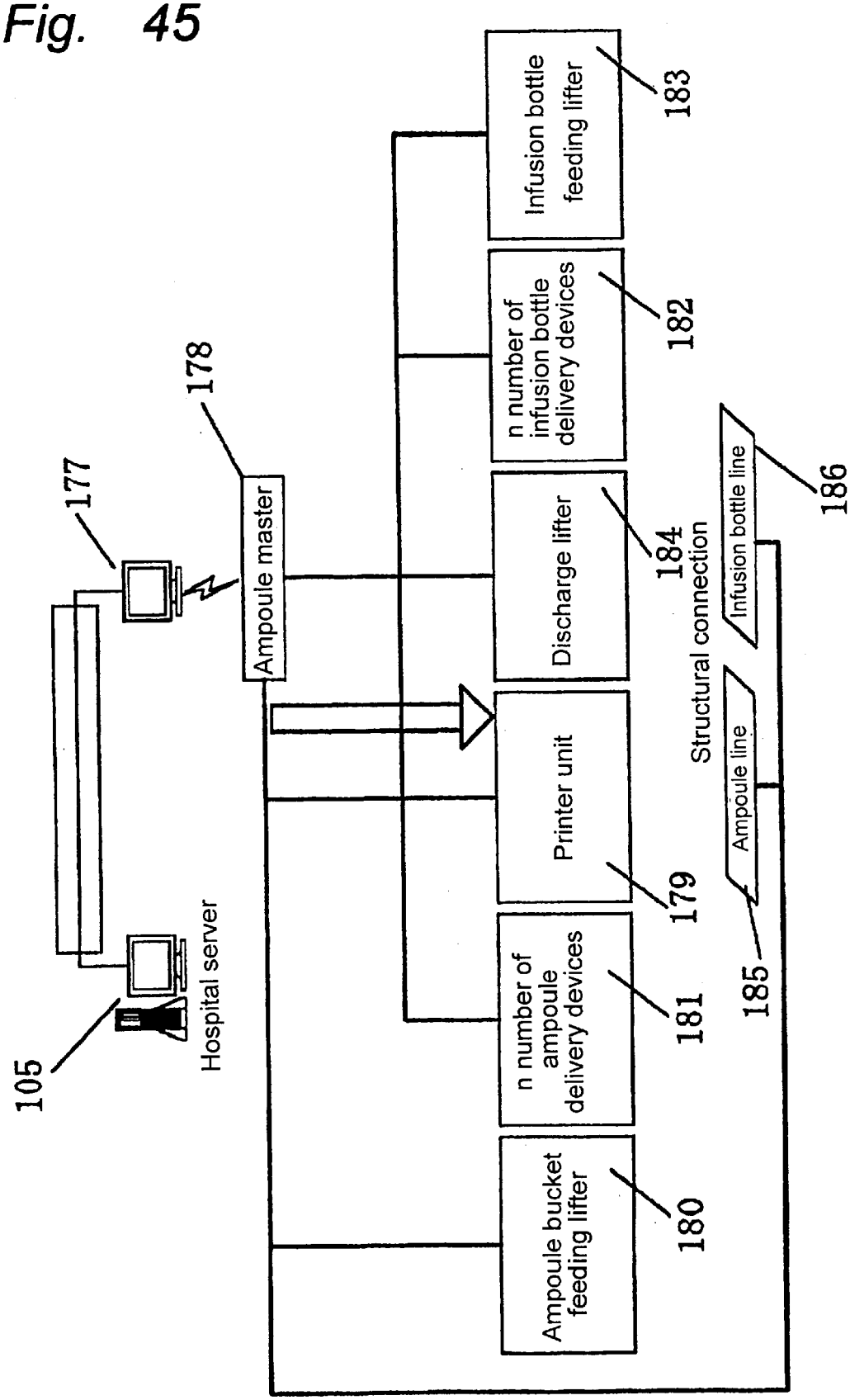
FIG. 45 is a block diagram showing a system having the automatic feeding device according to the first embodiment.

The above-structured automatic feeding device of an injection drug housing member may be used in a system shown in a block diagram of FIG. 45.

In the system, the injection drug prescription data installed in a server 105 placed in a hospital and the like is transmitted to a control terminal 178 via a delivery terminal 177. The control terminal transmits relative data among received data to each device including a printer unit 179, an ampoule bucket feeding lifter 180, an ampoule delivery device 181, an infusion bottle delivery device 182 according to the first embodiment, a bottle collecting bucket lifter 183, and a discharge lifter 184, and also controls timing of each device. Transmitted to each ampoule delivery device 181 is the data obtained by extracting ampoule data and vial data (composed only of code numbers) corresponding to respective ampoule delivery device 181 from the injection drug prescription data and collating it with a drug master. Transmitted to the infusion bottle delivery device 182 is the data obtained by extracting infusion bottle data corresponding to the infusion bottle delivery device 182 from the injection drug prescription data and collating it with a bottle master. The printer unit 179 prints out the contents of the injection drug prescription data. The ampoule bucket feeding lifter 180 delivers the bucket 11 to the bucket transportation line 10. The ampoule delivery device 181 is for automatically feeding ampoules housed in the container box 2 instead of the infusion bottles, and the basic structure thereof is approximately identical to the structure of the infusion bottle delivery device 182. The bottle collecting bucket lifter 183 delivers the bucket 11 to the bucket transportation line 10. The discharge lifter 184 delivers the bucket 11 containing the injection drug.

Figure 46:
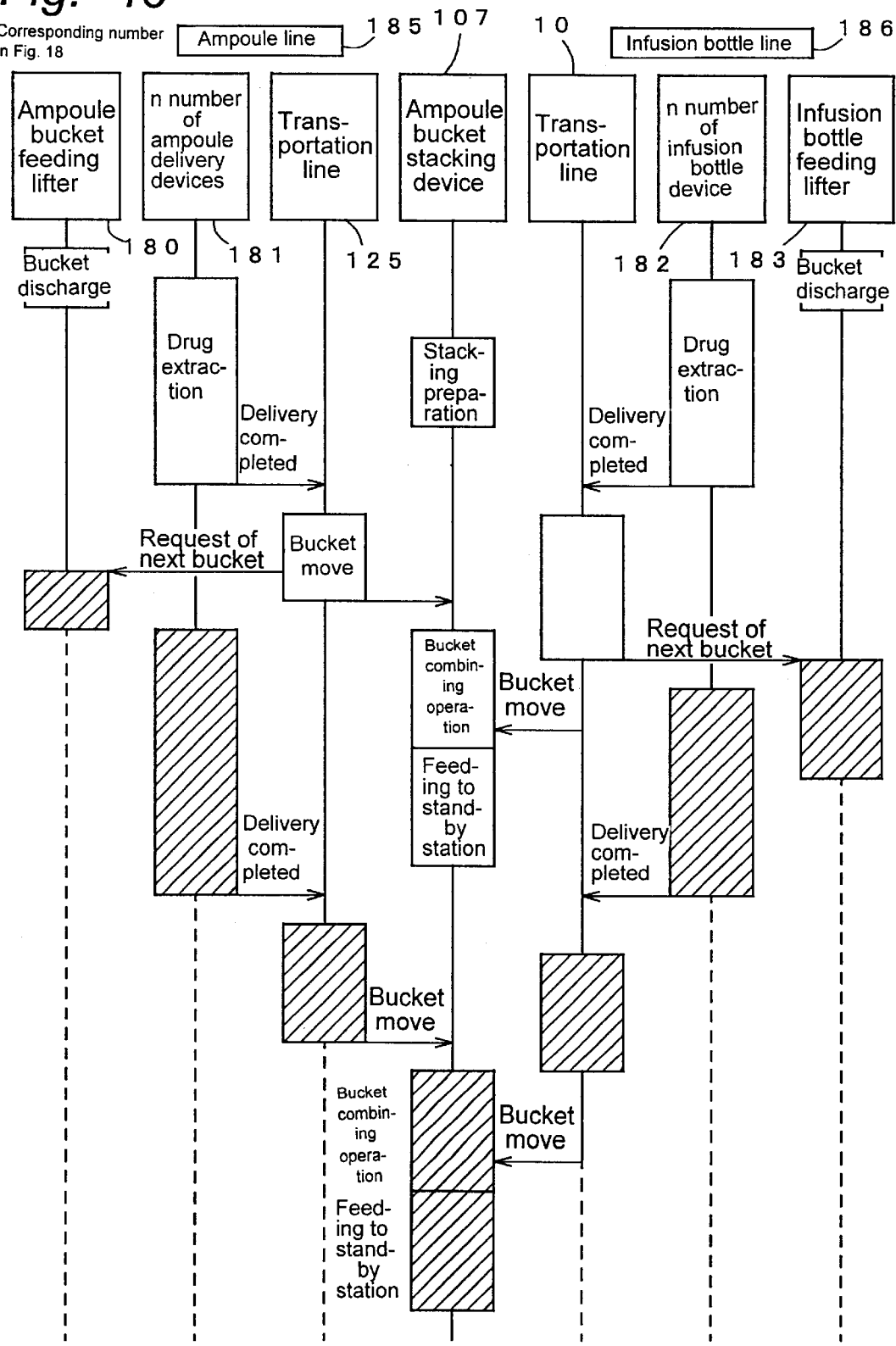
FIG. 46 is a timing chart showing operation of the system shown in FIG. 45.

In the system shown in FIG. 45, each component member is driven and controlled in accordance with a timing chart shown in FIG. 46.

More specifically, when a bucket 11 is discharged from the bucket lifter 183, extracting operation of an injection drug is started in the ampoule delivery device 181 and the infusion bottle delivery device 182 at almost the same time. When the extracted injection drugs are all delivered to the bucket 11, the bucket 11 is transported to a bucket stacking infeed device 107. Also, a feeding instruction of a next bucket 11 is transmitted to the bucket lifter 183. When the bucket 11 is transported from the bucket transportation line 10 to the bucket stacking infeed device 107, each bucket 11 is combined and accommodated in a standby station 108. Then, a loading amount and configuration of an infusion bottle and a soft bag to be loaded on the bucket 11 is managed.

Figures 47, 48:
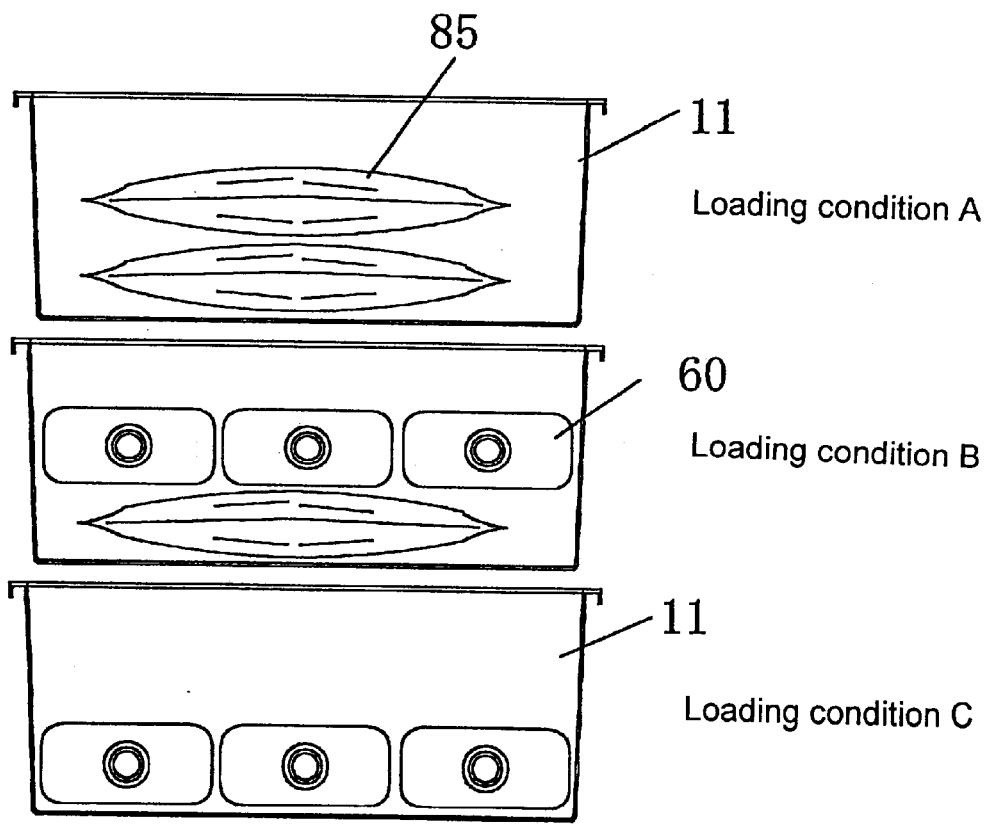
FIG. 47 is a maximum loading condition table for preventing overloading in the system shown in FIG. 45.
FIG. 48 is a schematic view showing configuration examples of an infusion bottle and a soft bag housed in the bucket.

Also in the system shown in FIG. 45, overloading is prevented based on a maximum loading condition table 187 for setting the maximum loading condition as shown in FIG. 47. In the example of FIG. 47, there is shown a maximum loading condition in the casing of storing a soft bag or an infusion bottle in the bucket 11, For example, in loading condition A, it is indicated that number of soft bags storable in the bucket 11 is 2 and an infusion bottle is not storable. Also in loading condition B, it is indicated that three infusion bottles are storable in the casing of storing one soft bag in the bucket 11. The loading state in the bucket 11 under each condition is as shown in FIG. 48. In FIG. 48, positions a, b, and c indicate that an infusion bottle is loaded in this order. In order to load an infusion bottle in each position, it is necessary, for example, to change a carry-in port of the input reserving portion 9 shown in FIG. 1 and a stop position of the bucket 11, or to directly transport the infusion bottle to the position by the grasp portion 7.

Figures 49, 50:
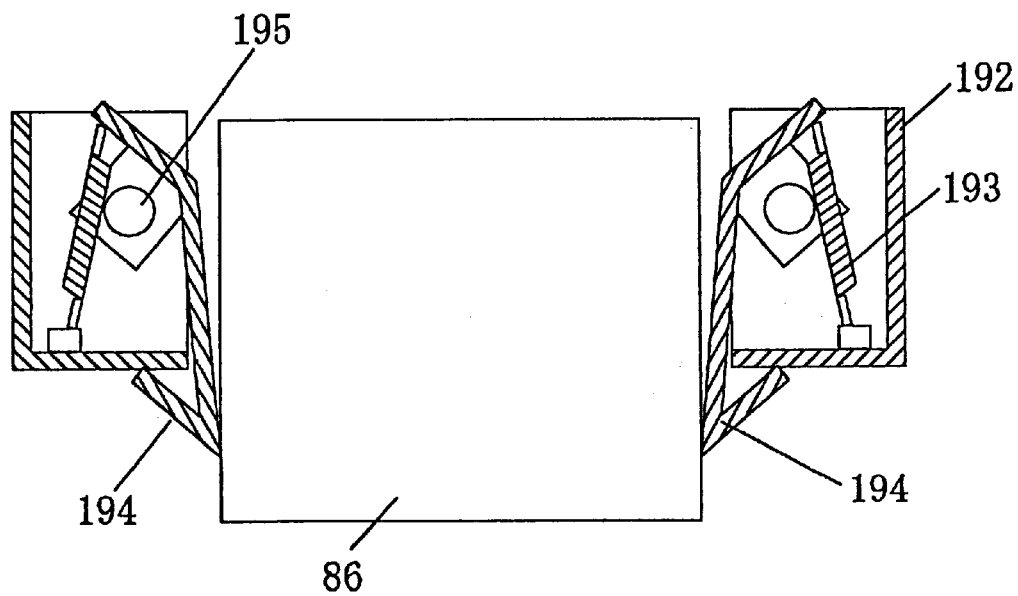
FIG. 49 is a table showing determination results of overloading of each prescription based on the maximum loading condition table shown in FIG. 47.
FIG. 50 is a schematic view showing a container holding device adoptable for the automatic feeding device according to the third embodiment.

In the casing where prescriptions 1 to n as shown in FIG. 49 are made based on injection drug prescription data, loading of infusion bottles and the like for the prescriptions 1 and 2 is possible though loading for the prescriptions 3, 4, and the like are not acceptable (expressed as "full" in FIG. 49). Some prescriptions specify an amount which exceeds the maximum amount storable in the bucket 11, and in such casing, a next bucket 11 is continuously fed for preventing halt of processing. The bottle positions a to c set in a condition item 188 correspond to loading position of the bucket 11, and when loading into the bucket 11 is carried out in actuality, bottles are loaded in order from the bottle position a.

Figure 52:
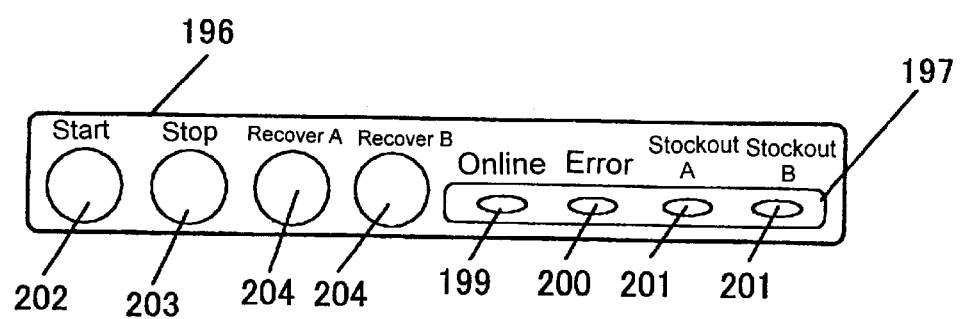
FIG. 52 is a front view showing a display panel adopted for the system shown in FIG. 45.

Also in the system shown in FIG. 45, there may be provided an operation panel as shown in FIG. 52. The operation panel 196 is made up of an indication lamp 197 and an operation button 198. The indication lamp 197 is composed of an online state lamp 199 for indicating online state, an error lamp 200 for indicating occurrence of errors, and a stockout lamp 201 for indicating stockout of injection drugs. The operation button 198 is composed of a start button 202 for restarting after termination at the time of errors, a stop button 203 for making a temporal stop at the time of provisional replenishment or problem solving, and a recover button 204 for removing an infusion bottle and the like under processing remained in the transportation portion and the like at the time of power failure or emergency stop. When the recover button 204 is operated, an infusion bottle 60 remained in the input reserving portion 9, a conveyer unit 79, and a loading unit 80 is once recovered, and the infusion bottle 60 is reset to recover initial conditions. Remained infusion bottles 60 are recovered by a temporarily-fed bucket 11.

Figure 53A:
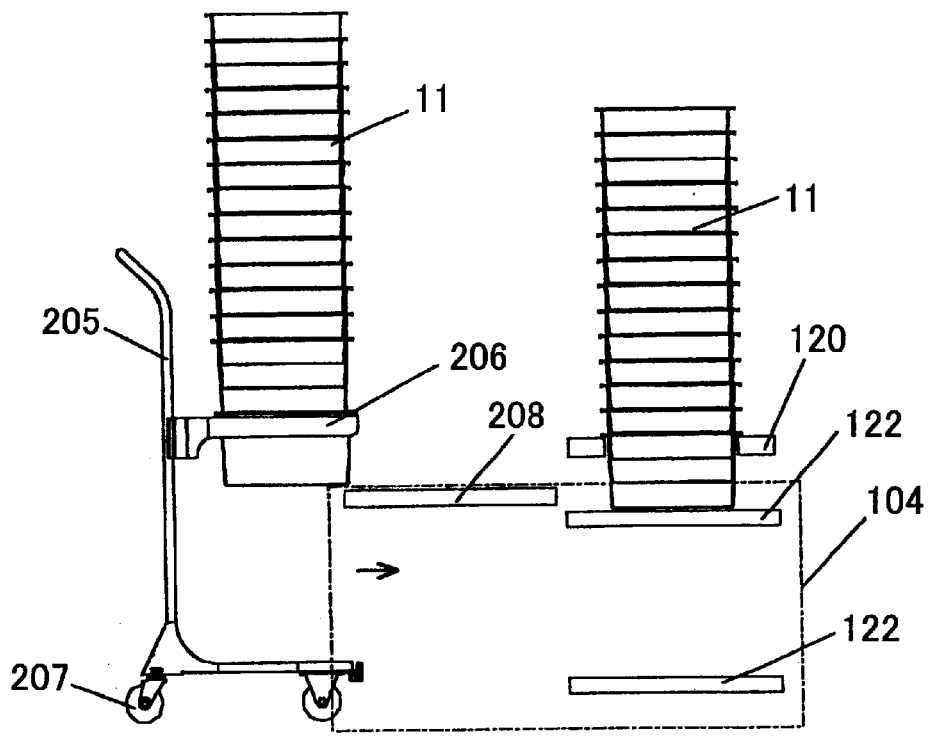
FIG. 53A is a schematic view showing buckets stacked up in a bucket cart for feeding the buckets to a bucket feeding device of the system shown in FIG. 45.
Figure 53B:
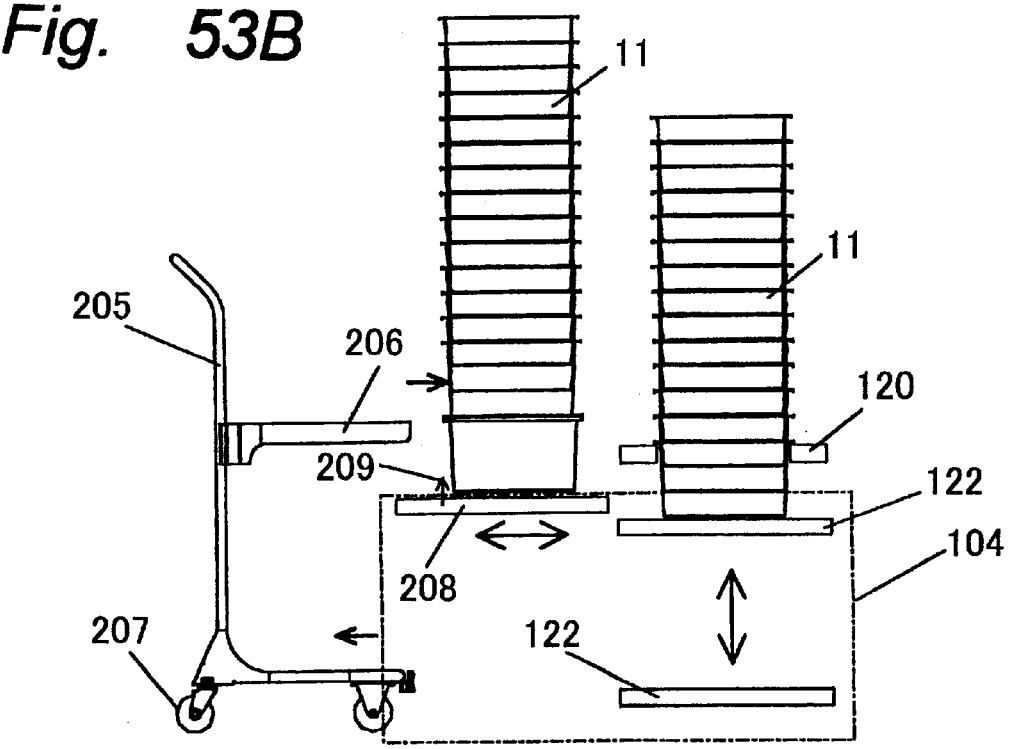
FIG. 53B is a schematic view showing the buckets stacked up in the bucket cart being fed to the bucket feeding device.

Although in the system shown in FIG. 45, the bucket 11 is fed from the bucket lifter 183, there may be used a bucket feeding device 104 as shown in FIGS. 53(*a*) and (*b*).

More particularly, in the bucket feeding device, a bucket 11 is fed in a stacked state to a conveyer 208 by a bucket cart 205, and transferred to a conveyer 122. Here, a bucket 11 second from the bottom is supported by a support portion 120. Consequently, lowering the conveyer 122 makes it possible to take out only a lowermost bucket 11.

Second Embodiment

Figure 11:
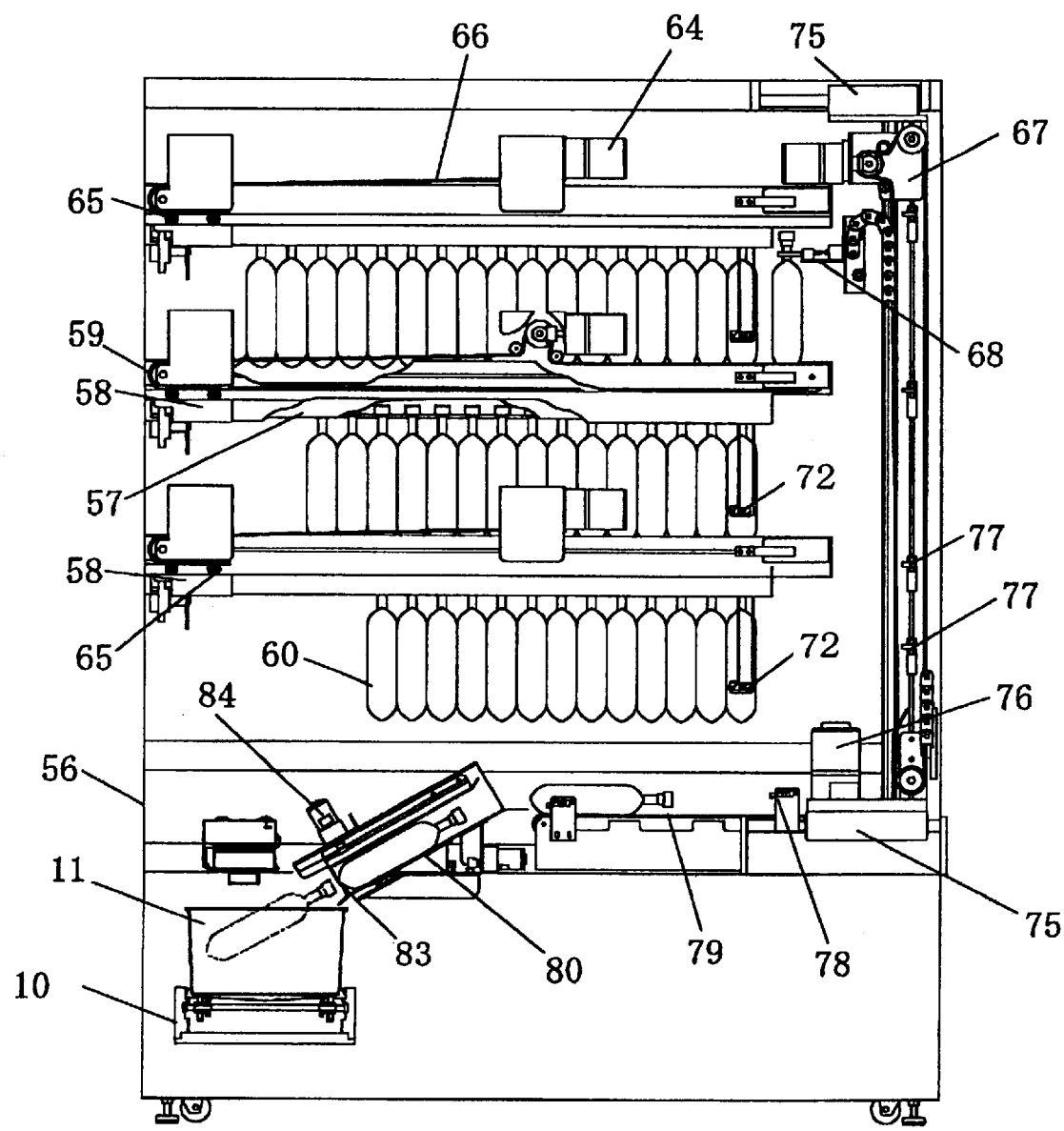
FIG. 11 is a side view of FIG. 10.

FIG. 11 shows an automatic feeding device of an injection drug housing member according to a second embodiment.

Figure 12:
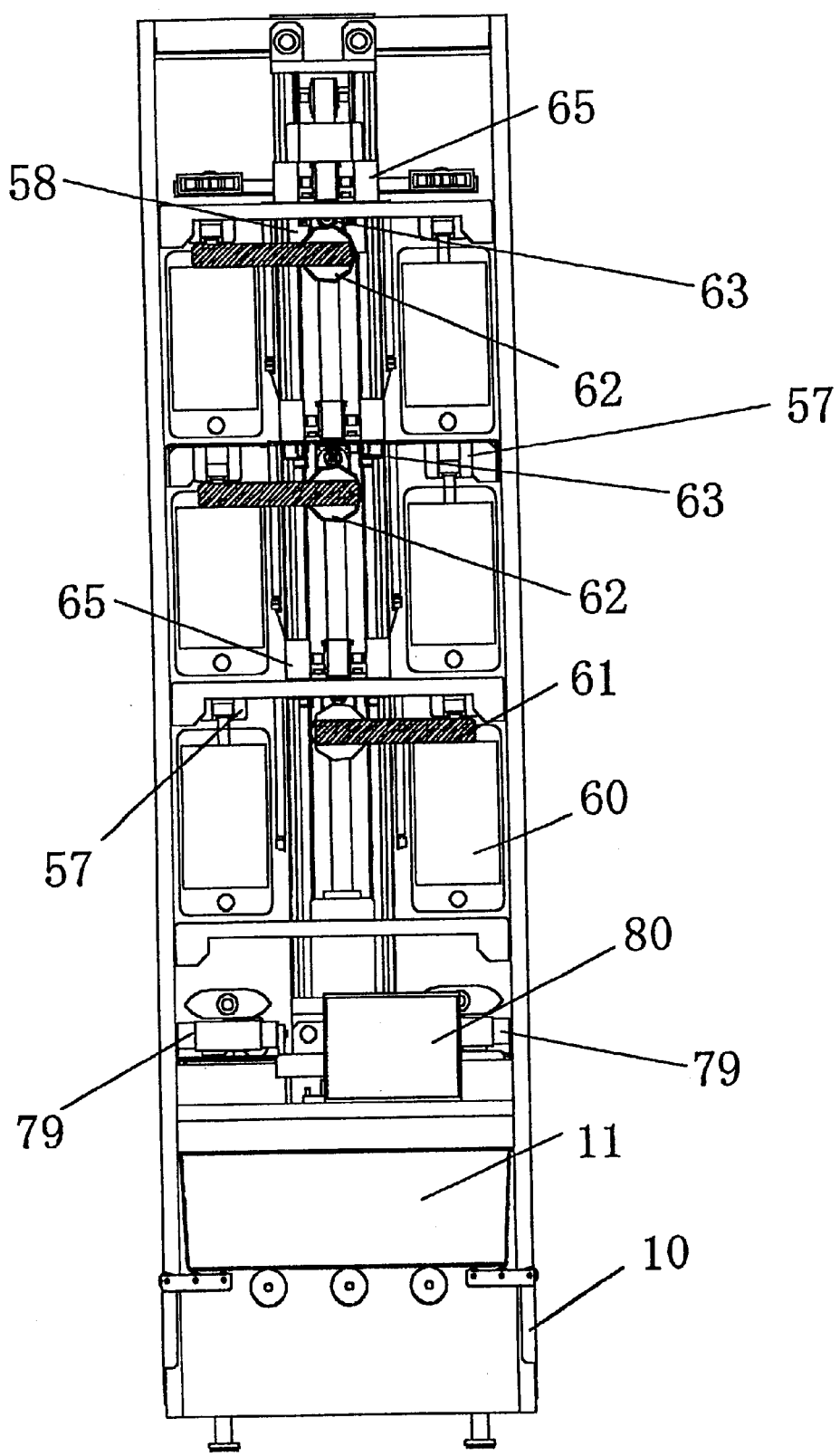
FIG. 12 is a front view of FIG. 10.
Figure 13:
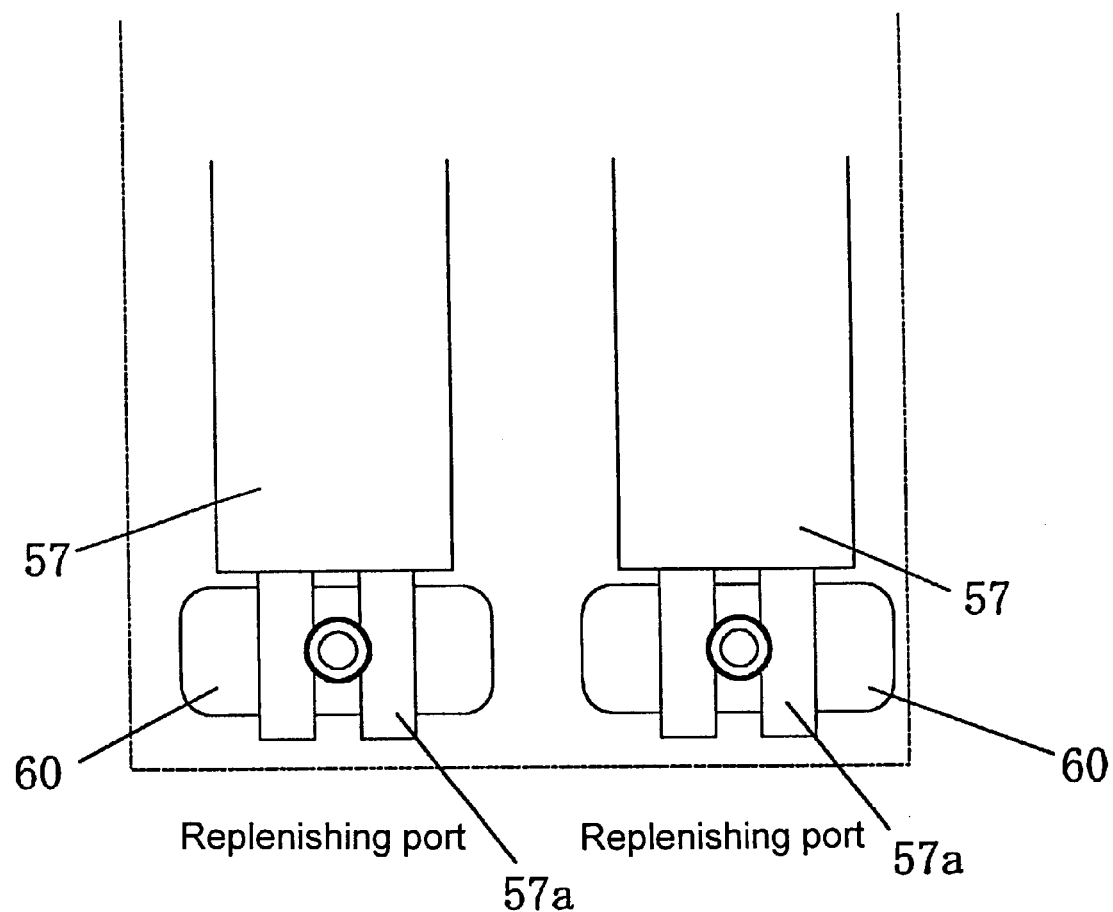
FIG. 13 is a plane view showing a stage portion of a holding rail shown in FIG. 11.

In the automatic feeding device of an injection drug housing member, a pair of holding rails 57 is provided in a plurality of rows inside a casing 56. On each of the holding rails 57, infusion bottles 60 are aligned and held with the bottleneck thereof being held therebetween. On one end portion of the holding rail, a slit-like stage portion 57*a* is provided to facilitate feeding of the infusion bottles 60. The infusion bottle 60 held by the holding rails 57 is transported by a bolt infeed unit 58. The bolt infeed unit 58 is provided with an infeed bar 61 which is rotated via a gear 62 by driving of a motor 63 and positioned in either left or light horizontal direction shown in FIG. 12. Also, the bolt infeed unit 58 has a roller 65 on the bottom, and reciprocates on the holding rails 57 in horizontal direction in FIG. 11 via a belt 66 and a pulley 59 by driving of the motor 64. It is noted that a sensor 72 for detecting the presence of an infusion bottle 60 is provided on the terminal end of the holding rails 57.

Figure 14A:
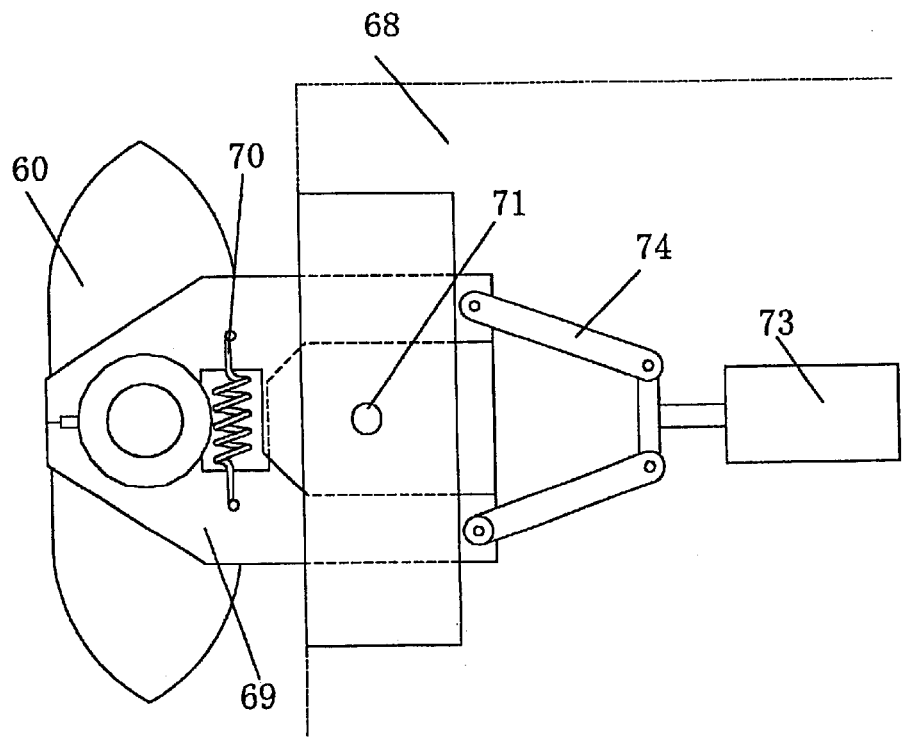
FIG. 14 is a plane view showing an arm pawl of an grasp arm of FIG. 11 in the state of being closed.
FIG. 14B is a plane view showing the arm pawl of FIG. 14A in the state of being opened.
Figure 14B:
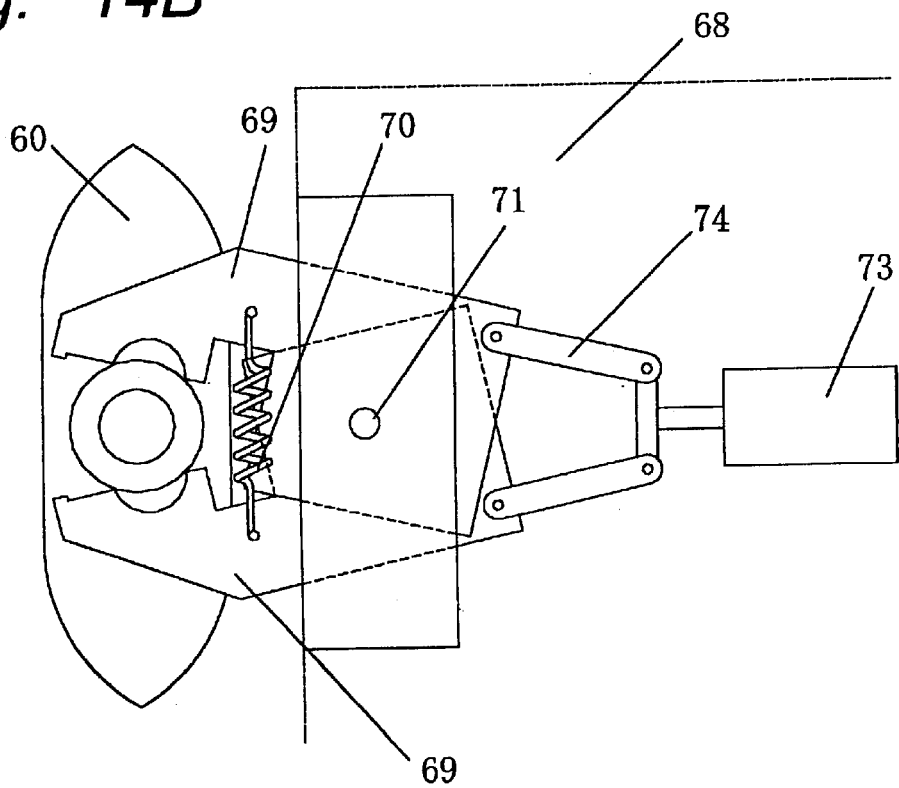

Also, on the terminal end inner face of the holding rails 57 of the casing 56, there is provided a lifter unit 67 having a grasp arm 68. As shown in FIGS. 14(a) and 14(b), the grasp arm 68 is provided with a pair of arm pawls 69 rotatable around a rotation axis 71. The arm pawls 69 are pressed by a spring 70 so that end holding portions come close to each other. The arm pawls 69 are rotated via a link 74 by driving of a solenoid 73, and the top holding portions are opened and closed. The grasp arm 68 is capable of going up and down by driving of a motor 76. It is note that the lifter unit 67 is provided with a sensor 77 in a side position corresponding to each of the holding rails 57, which detects the grasp arm 68 being properly positioned. Also, on the lower portion of the casing 56, there is provided a senor 78, which detects a forward position of the grasp arm 68, that is the position enabling proper holding of the infusion bottle 60 by the grasp arm 68.

Also, on the lower portion of the casing 56, there are provided a conveyer unit 79 and a loading unit 80. The conveyer unit 79 is driven for transporting the infusion bottle 60 to the loading unit 80 when an infusion bottle 60 from the lifter unit 67 is detected by an unshown sensor. The loading unit 80 is provided so as to be inclined toward a bucket 11 on the bucket transportation line 10. On the outlet of the loading unit 80, there is provided a shutter 83, which is openable by driving of a motor 84. It is noted that the sensor may be provided on the grasp arm 68 instead of the conveyer unit 79.

Next description discusses operation of the above-structured automatic feeding device of an injection drug housing member.

Infusion bottles 60 are fed in advance by kind to each of the holding rails 57 and aligned. Then based on injection drug prescription data, the infeed bar 61 is moved to one end side of the holding rails 57 in which an appropriate infusion bottle 60 is aligned. In this casing, the motor 63 is driven to turn the infeed bar 61 to vertical downward direction to avoid interference with the infusion bottle 60. Once the infeed bar 61 is moved to a desired position, the motor 63 is driven again to rotate the infeed bar 61 in vertical direction. Then, the motor 64 is driven to move an appropriate infusion bottle 60. The moving operation is continued till the infusion bottle 60 is detected by the sensor 72. When the infusion bottle 60 is detected by the sensor 72, the motor 76 is driven to move the grasp arm 68 to the side of a desired holding rail 57. The moving operation is continued till the grasp arm 68 is detected by the sensor 77. When the grasp arm 68 is moved to a desired position, the motor 64 is driven to move the lifter unit 67 for enabling the grasp arm 68 to grasp the infusion bottle 60. The moving operation is continued till the infusion bottle 60 is detected by the sensor 78.

Next, the solenoid 73 is driven to grasp the bottleneck of an appropriate infusion bottle 60 by the arm pawls 69. Then, the lifter unit 67 is moved to transport the grasped infusion bottle 60 downward and feed it to he conveyer unit 79.

Herein, if the infusion bottle 60 which should have been transported is not detected by the sensor, the grasp arm 68 is driven again to repeat the previous operation. If the infusion bottle 60 is detected by the sensor, the infusion bottle 60 is transported to the loading unit 80. In the loading unit 80, the infusion bottle 60 under transportation is temporarily held by the shutter 83, and is discharged after the infusion bottle 60 is shifted to the bucket 11.

Third Embodiment

Figure 16:
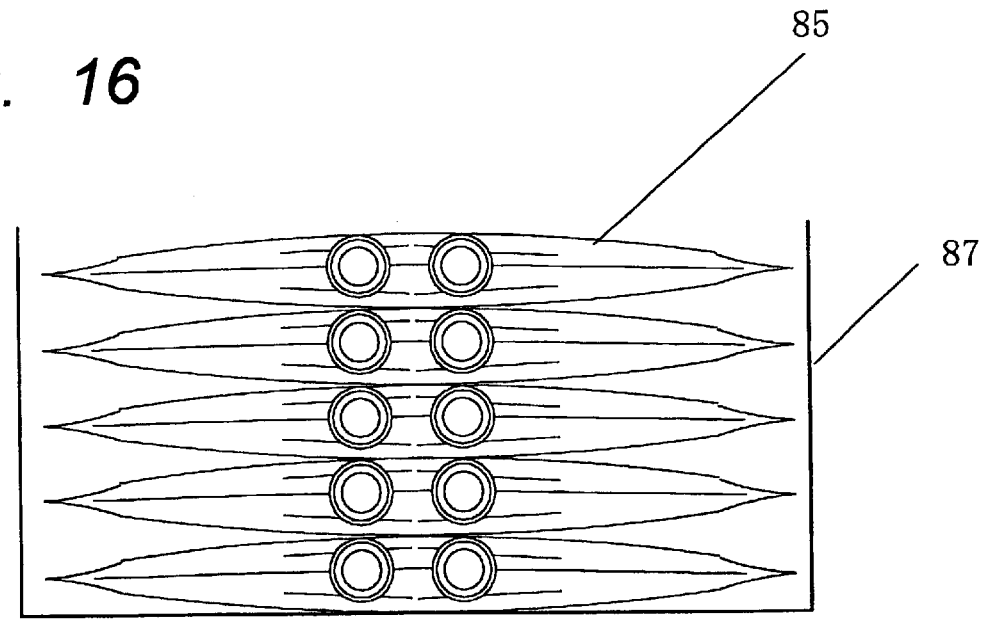
FIG. 16 is a partially broken perspective view showing a container box for containing a soft bag in another example.
Figure 17A:
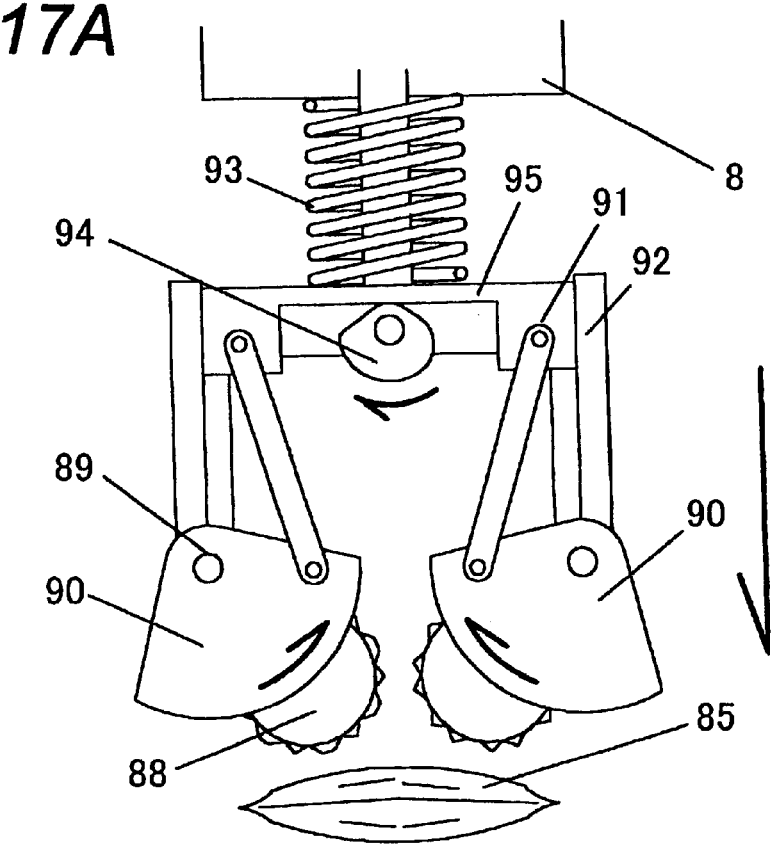
FIG. 17A is a view showing a grasp potion of an infusion bottle feeding device according to a third embodiment before grasping a soft bag.

FIG. 17 shows a grasp portion 7 that is a characterizing portion of an automatic feeding device of an injection drug housing member according to a third embodiment. As shown in FIG. 16, the grasp portion 7 has a pair of elastic holding portions 88 suitable for grasping soft bags 85 that are stacked flat. Each of the elastic holding portions 88 is made from an elastic material having high coefficient of friction such as silicon and rubber, and is fixed to a support member 90. The support member 90 is provided on a frame body 92 rotatably around a spindle 89. On the frame body 92, there is provided a support block 95 so as to enable up and down motion. The support block 95 is pressed downward by a spring 93 disposed around a rod. A cum provided on top of the rod is rotated by driving of an unshown motor, which relatively moves the support block 95 up and down against the frame body 92. The support member 90 and the support block 95 are rotatably connected via a link 91. By a sensor composed of a light emitting element and a light receiving element each provided in the vicinity of each of the spindles 89, the surface sheet of the soft bag 85 held between the elastic holding portions 88 may be detected as described later.

Next description discusses operation of the above-structured grasp portion 7.

Figure 17B:
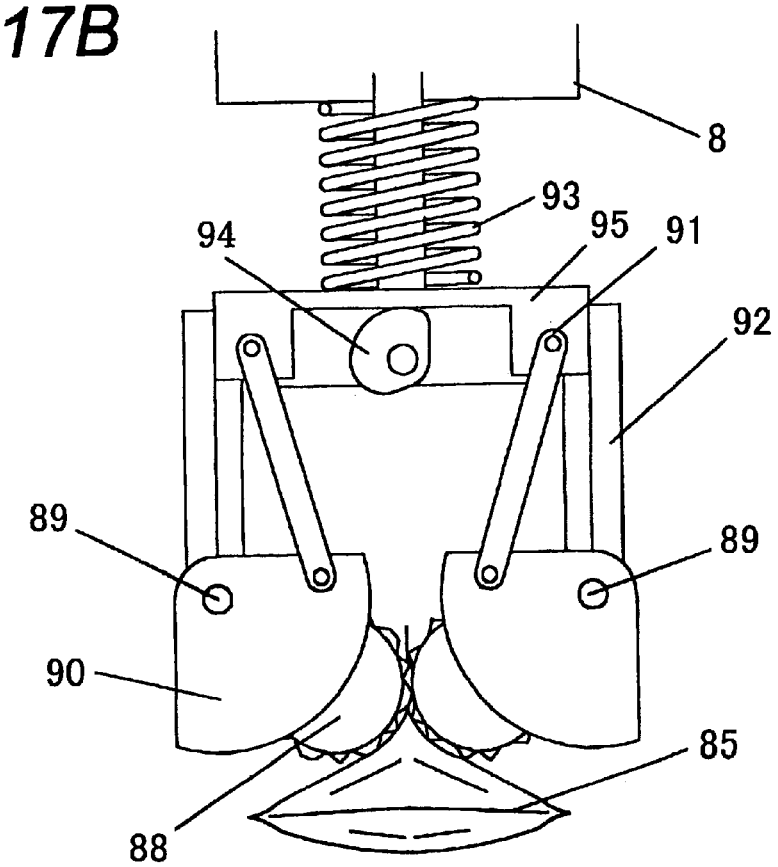
FIG. 17B is a view showing the grasp portion of FIG. 17A in the state of grasping the surface sheet of the soft bag.

First, based on the coordinate data, the grasp portion 7 is brought close to a soft bag 85 in the container box 2 from the upper side to bring the elastic holding portions 88 into contact with the surface sheet. Then, a cum 94 is rotated by driving of an unshown motor to raise the support block 95. Consequently, the support members 90 rotate around a spindle 89 via the link 91, by which the surface sheet of the soft bag 85 is held therebetween as shown in FIG. 17(b). Here, whether or not the surface sheet of the soft bag 85 is properly held therebetween is detected by a sensor. If proper holding is detection, the grasp portion 7 is moved to transfer the soft bag 85 to the input reserving portion 9.

Figure 18A:
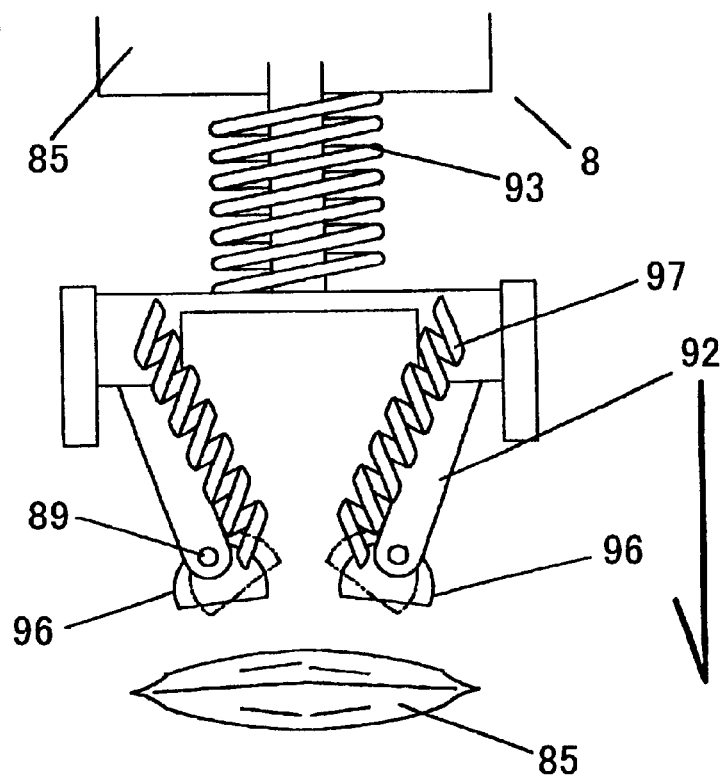
FIG. 18A is a view showing the grasp portion in another example before sucking and holding the soft bag.
Figure 18B:
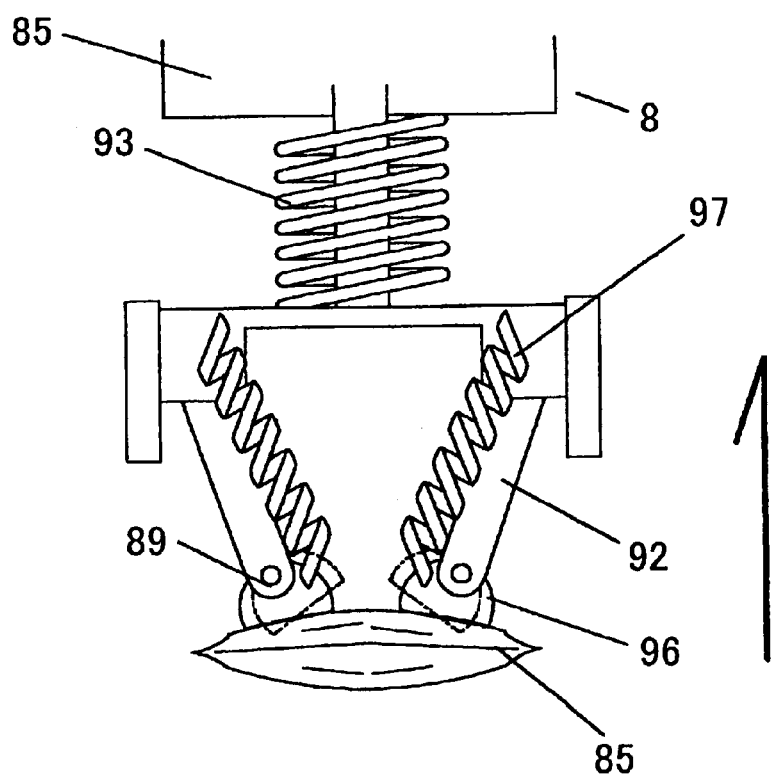
FIG. 18B is a view showing the grasp portion of FIG. 18A in the state of sucking and holding the surface sheet of the soft bag.

It is noted that the grasp portion 7 may be structured as shown in FIG. 18. More specifically, in FIG. 18, a sucker cup 96 is provided on the frame body 92 rotatably around a spindle 89. The sucker cup 96 has a hemispherical suction face, to which a pad such as silicon rubber, natural rubber, and synthetic rubber is attached. Also, in the central portion of the suction face and the pad, there is formed a penetrating hole connected to an exhaust pipe 97. This enables the sucker cup 96 to suck the soft bag 85. It is noted that the sucker cups 96 are pressed in the direction so as to face to each other by a spring 97.

Figure 15:
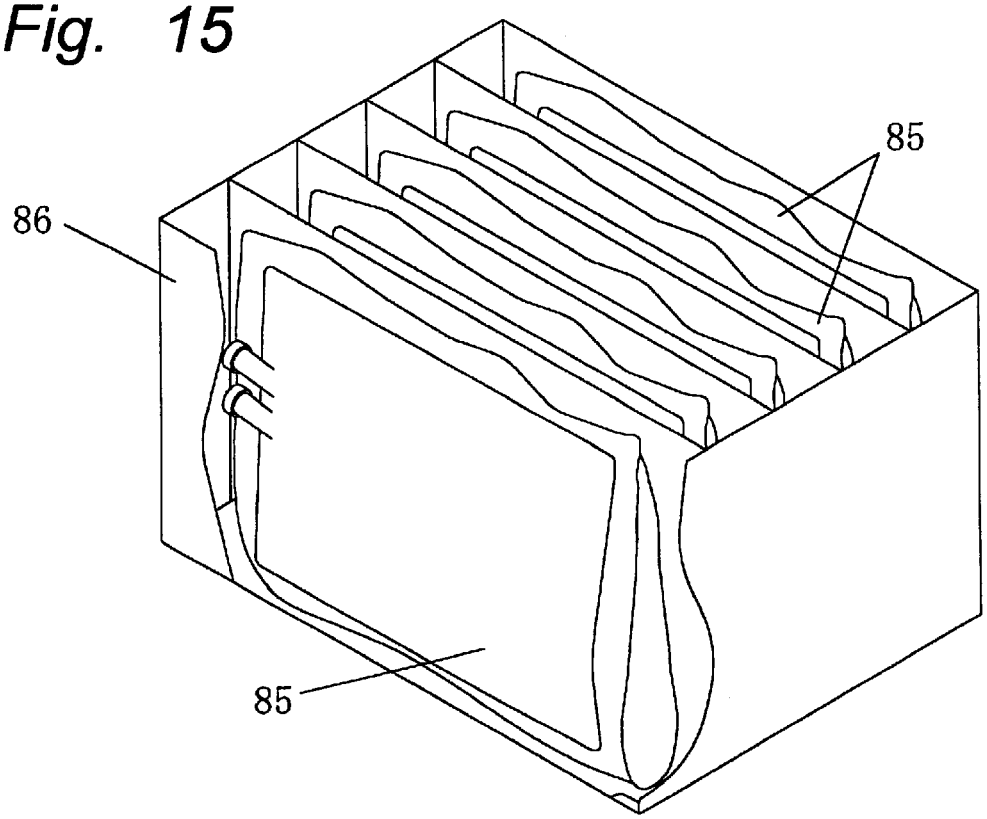
FIG. 15 is a partially broken perspective view showing a container box for containing a soft bag in one example.

Also, the soft bag 85 is heavy-weighted since it contains 1 to 2 litter of liquid injection drug, so that as shown in FIG. 15 it is housed in the container box 2 parted by a cardboard plate. Therefore, for grasping the soft bag 85 by the grasp portion 7 shown in FIG. 1, the position of each soft bag 85 may be registered as coordinate data and based on the coordinate data, the grasp portion 7 may be driven and controlled.

Figure 51:
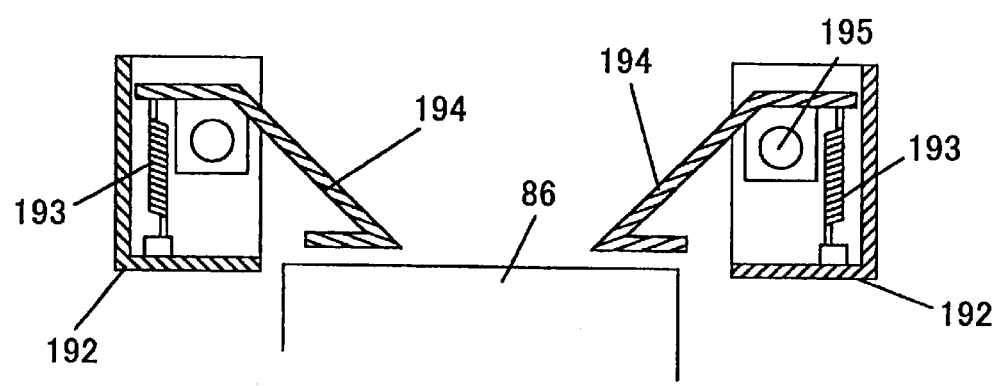
FIG. 51 is a schematic view showing another example of the container holding device adoptable for the automatic feeding device according to the third embodiment.

Also, in the automatic feeding device of an injection drug housing member according to the third embodiment, there may be provided a container holding device as shown in FIG. 50 and FIG. 51. The container support device is structured such that a holding pawl 194 is provided on a holding member 192 rotatably around a spindle 195. The holding pawl 194 is rotatably pressed to the position shown in FIG. 50 to FIG. 51 by a spring.

According to the container holding device, when a container box 2 is fed from the upper side as shown in FIG. 50, the holding pawl 194 is rotated to allow moving of the container box 2. With passing of the container box 2, the holding pawl 194 is returned to an original position by pressing forces of a spring 193, which interrupts rising of the container box 2. Consequently, even in the casing of taking out a soft bag 85, particularly the last soft bag 85 from the container box 2 by the above-structured grasp portion 7, the container box 2 is held by the holding pawl 194, which prevents generation of deficiency.

Fourth Embodiment

Figure 19:
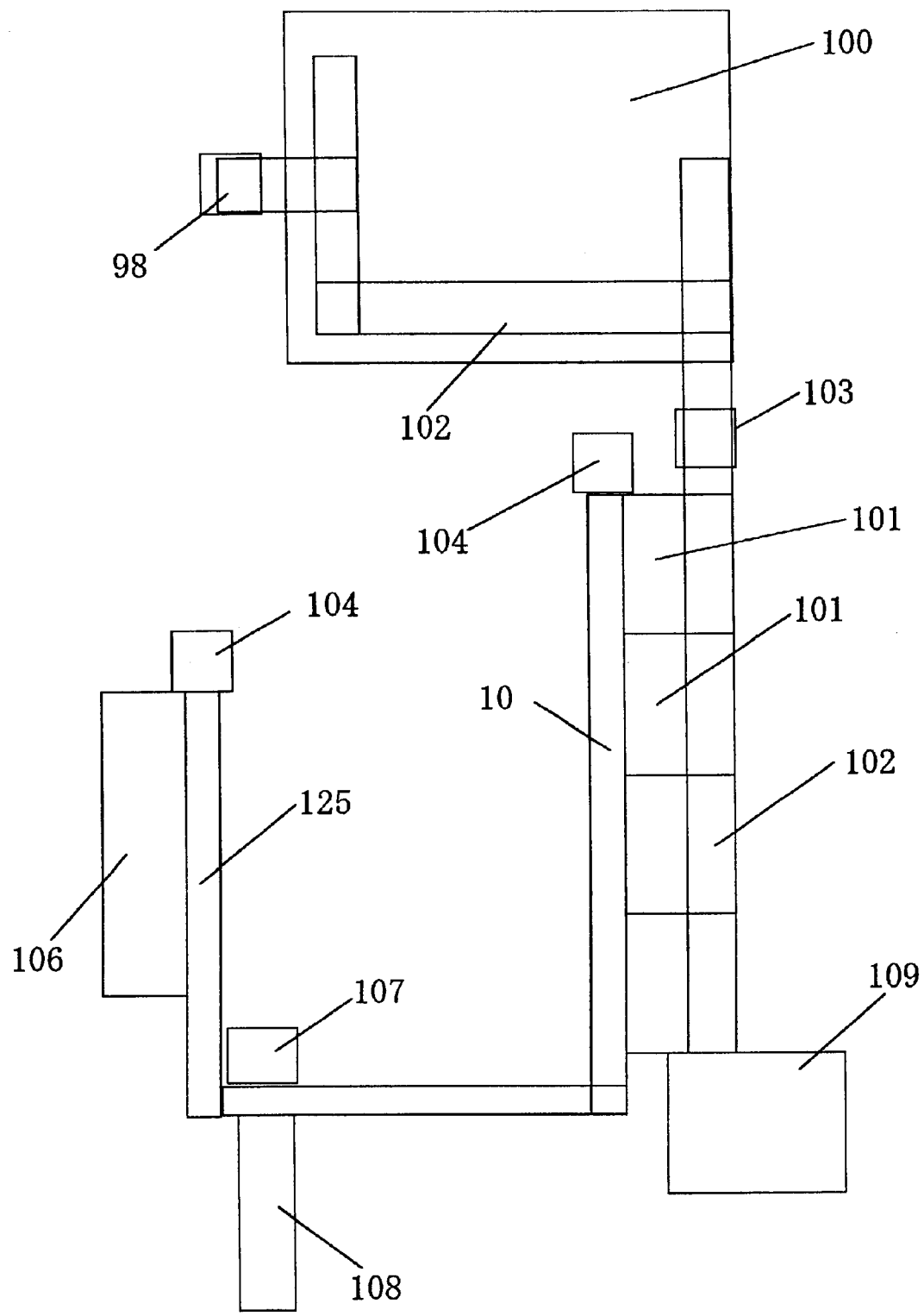
FIG. 19 is a block diagram showing an infusion bottle feeding device according to a fourth embodiment.

FIG. 19 shows an automatic feeding device of an injection drug housing member according to a fourth embodiment. The automatic feeding device of an injection drug housing member is provided with a bottle line 186 for automatically feeding an infusion bottle 60 packed in the container box 2 and an line 185 for automatically feeding aligned ampoules.

In the bottle line 186, a container box 2 is fed from an automatic storehouse 100 through a container box transportation line 102 to an infusion loading device 101, where the infusion bottle 60 is taken out and transferred from a bucket feeding device 104 to a bucket 11 fed to the transportation line 10, and transported to a standby station 108.

Figure 20:
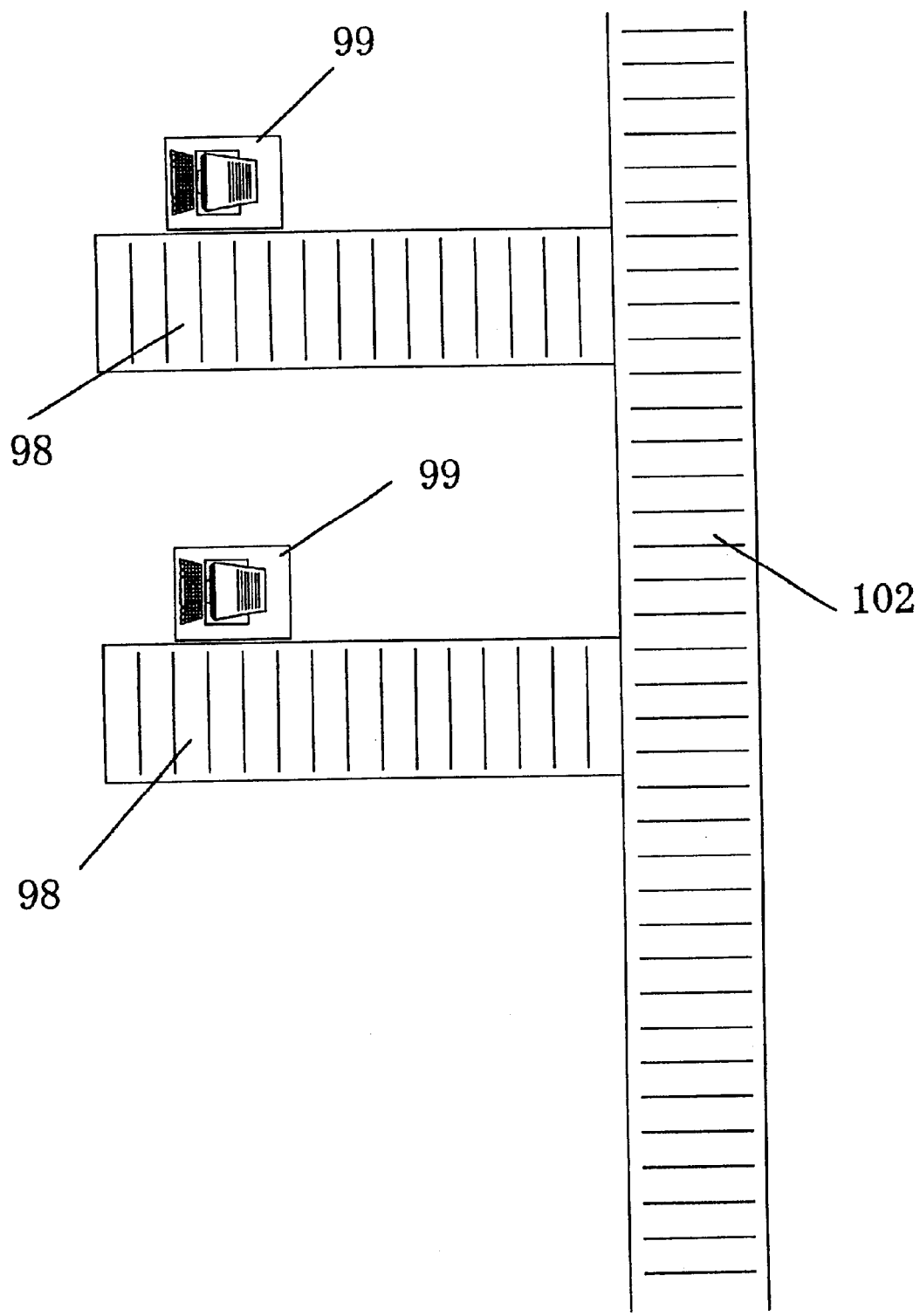
FIG. 20 is a schematic view showing a receiving station shown in FIG. 19.

The automatic storehouse 100 is provided with a receiving station 98 capable of receiving a container box 2 in which infusion bottles 60 are packed. In the receiving station 98, necessary management data and the like including a drug name, quantity, storage place ID, and lot number are inputted by an input terminal 99 shown in FIG. 20. It is noted that the data may be inputted by utilizing a barcode and the like put on the container box 2 containing the infusion bottle. Also, the automatic storehouse 100 is provided with a container box transportation line 102 for temporarily reserving a received container box 2.

Figure 21:
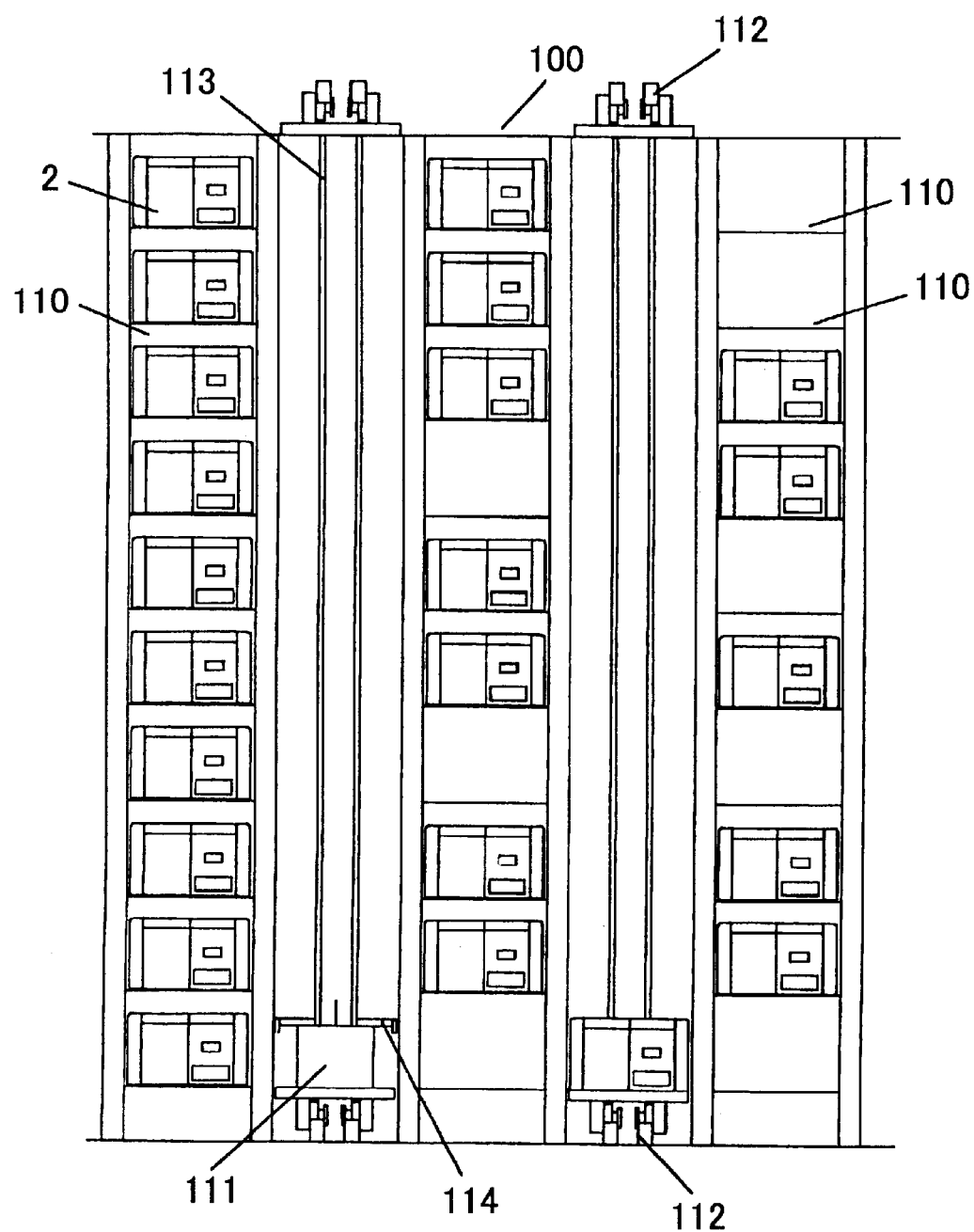
FIG. 21 is a front view showing an automatic storehouse adoptable for the receiving station shown in FIG. 20.

It is noted that for the automatic storehouse 100, a structure shown in FIG. 21 may be adopted. More particularly, a storage rack 110 is provided in a plurality of rows, and a container box 60 stored in each storage rack 110 is automatically discharged by a lifter 111. It is noted that a storage place ID is set for each storage rack 110 for centralizing retrieval and storage management, lot management and the like.

Figure 22:
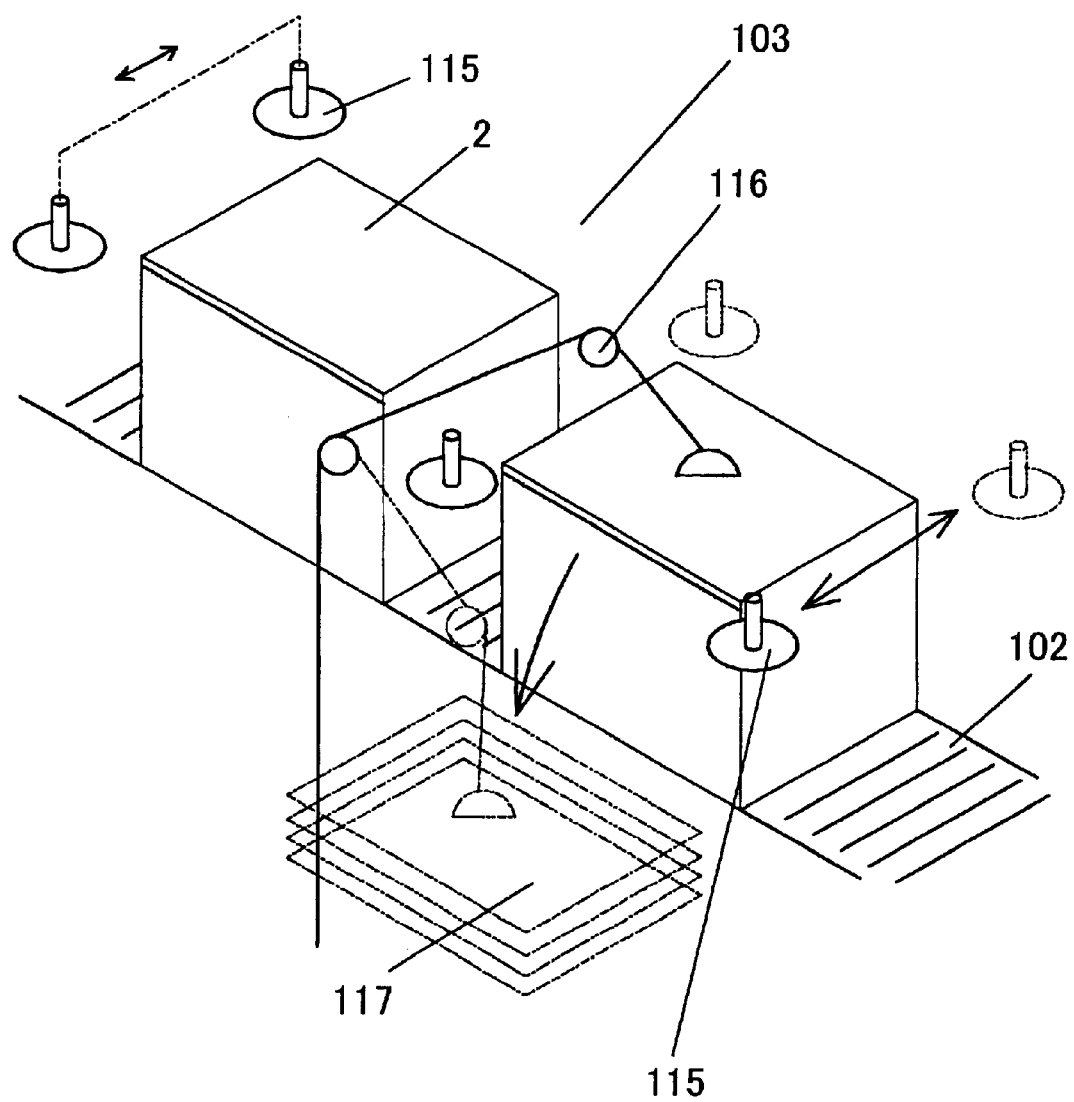
FIG. 22 is a schematic view showing an opening device shown in FIG. 19.

In the middle of the container box transportation line 102, an opening device 103 is provided. As shown in FIG. 22, the opening device 103 is composed of a pair of cutters 115 for simultaneously cutting the both sides of the container box 60, and a removal device 116 for holding the cut upper face and stacking it in a stacking position 117. The removal device 116 is equipped with a vacuum device for sucking and holding the cut upper face.

Figure 23:
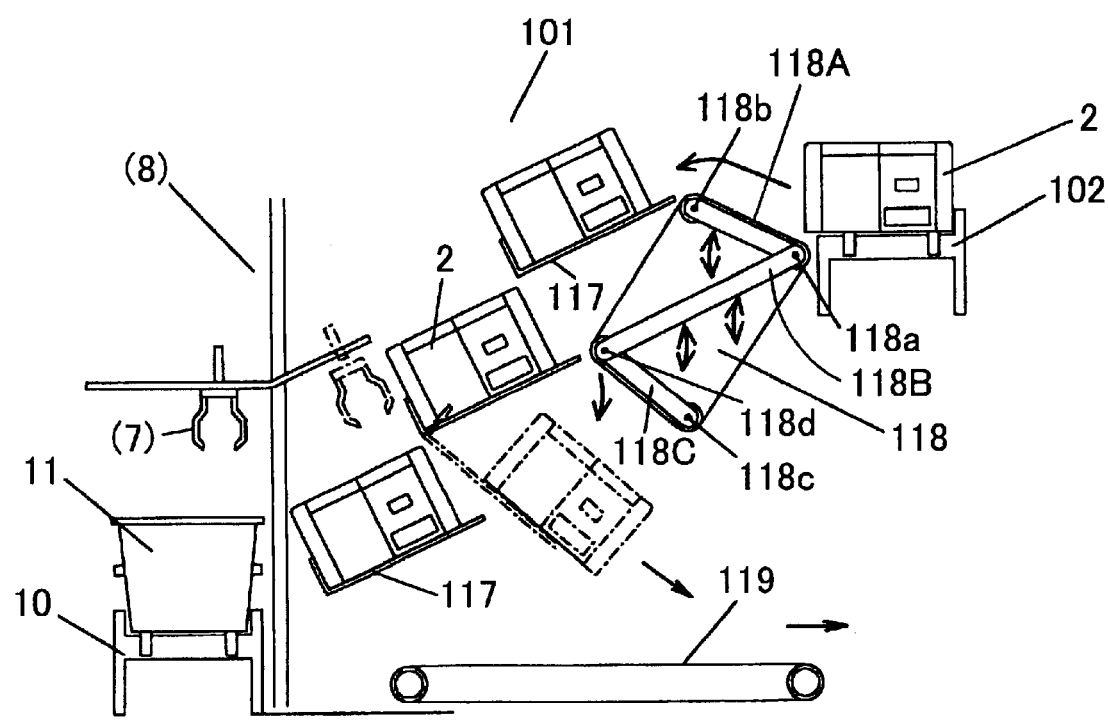
FIG. 23 is a schematic view showing the operating state in the casing of transporting a container box to the upper rack inside an infusion loading device shown in FIG. 19.
Figure 24:
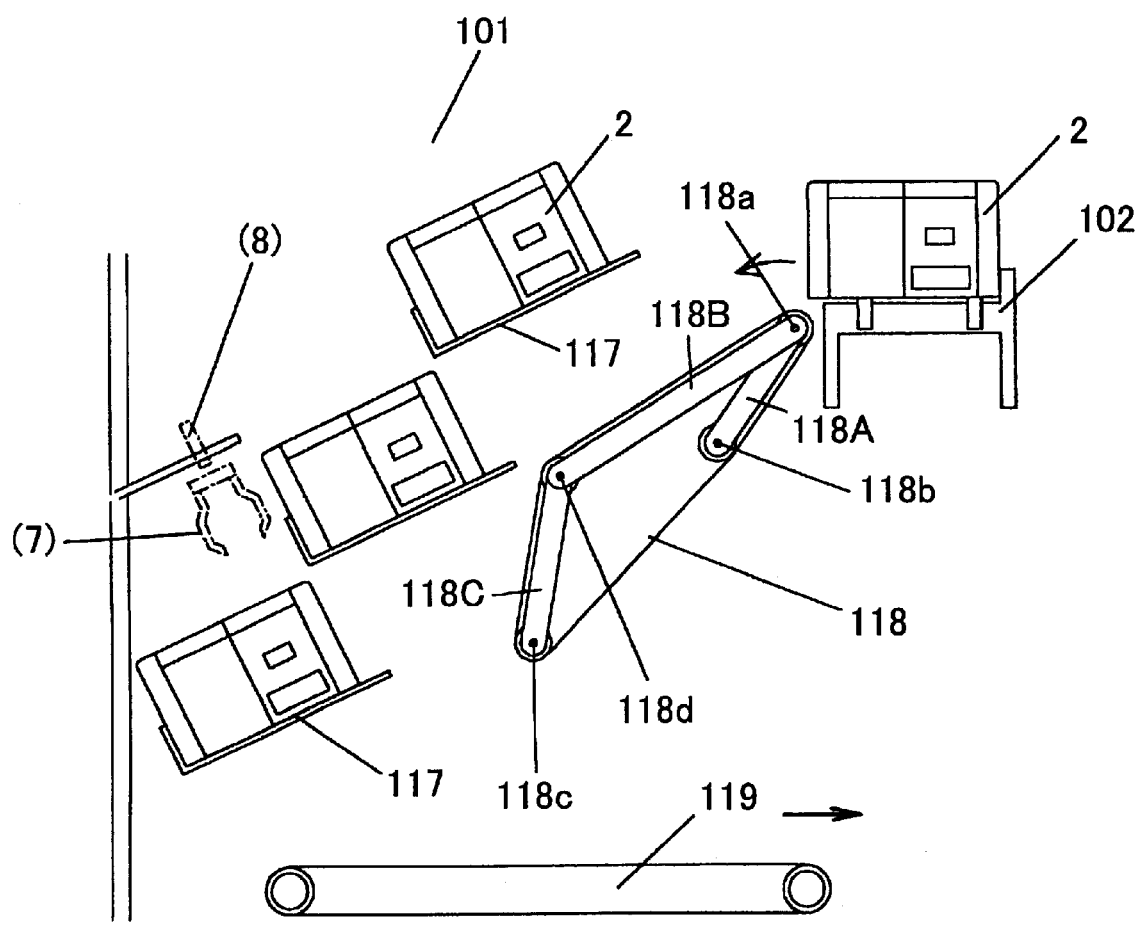
FIG. 24 is a schematic view showing the operating state in the casing of transporting a container box to the middle rack inside the infusion loading device shown in FIG. 19.
Figure 25:
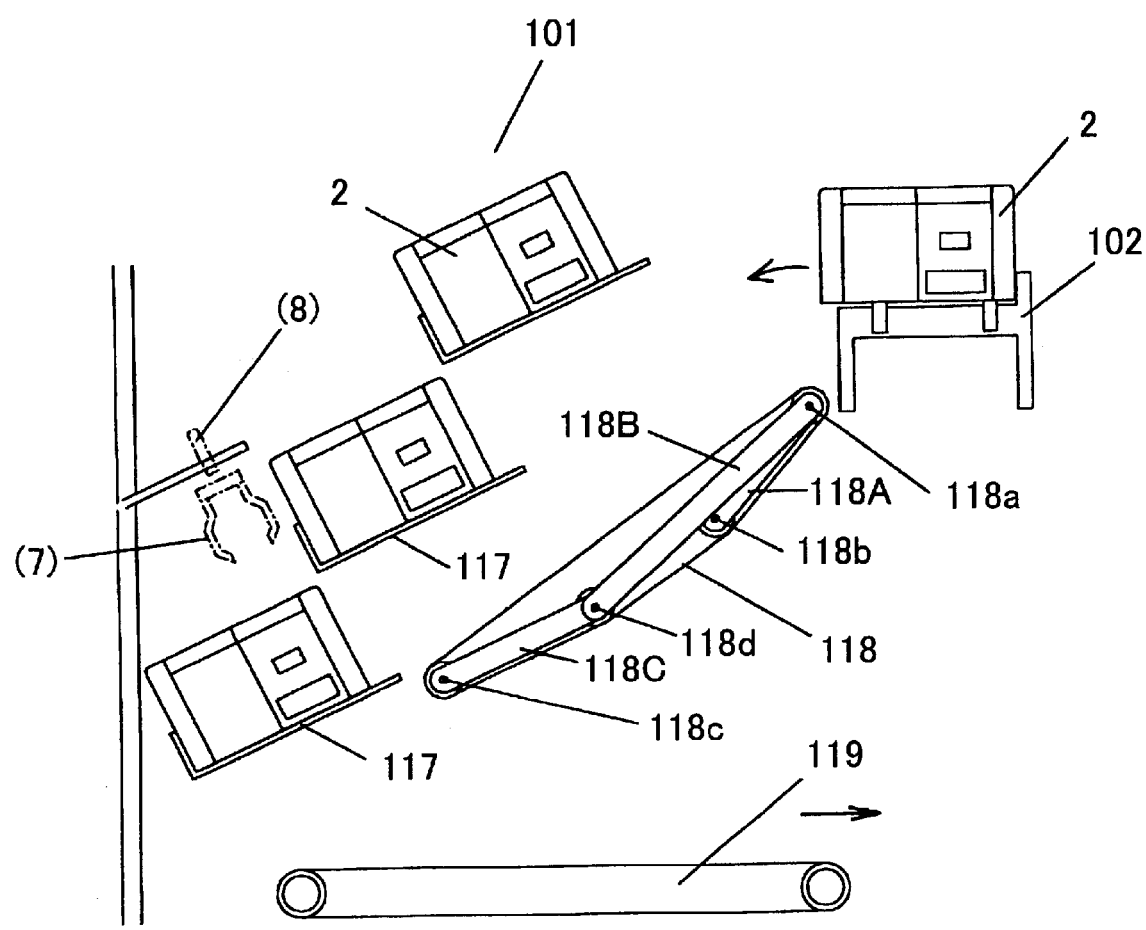
FIG. 25 is a schematic view showing the operating state in the casing of transporting a container box to the lower rack inside the infusion loading device shown in FIG. 19.

As shown in FIG. 23, the infusion bottle loading device 101 is composed of a flexible belt 118 and three racks 177. As shown in FIG. 23 to FIG. 25, the flexible belt 118 is operated such that a first belt 118A and a second belt 118B rotate with a pulley 118a as a rigid axis, while a third belt 118C rotates around a pulley 118b of the second belt 118B. A container box 2 transferred to the racks 177 is grasped and discharged by the devices similar to the grasp portion 7 and the movement unit 8. When the container box 2 is emptied, the racks 177 are rotated to fall the empty box to an empty box recovery belt 119 for transporting it to an empty box recovery portion 109.

Figure 27:
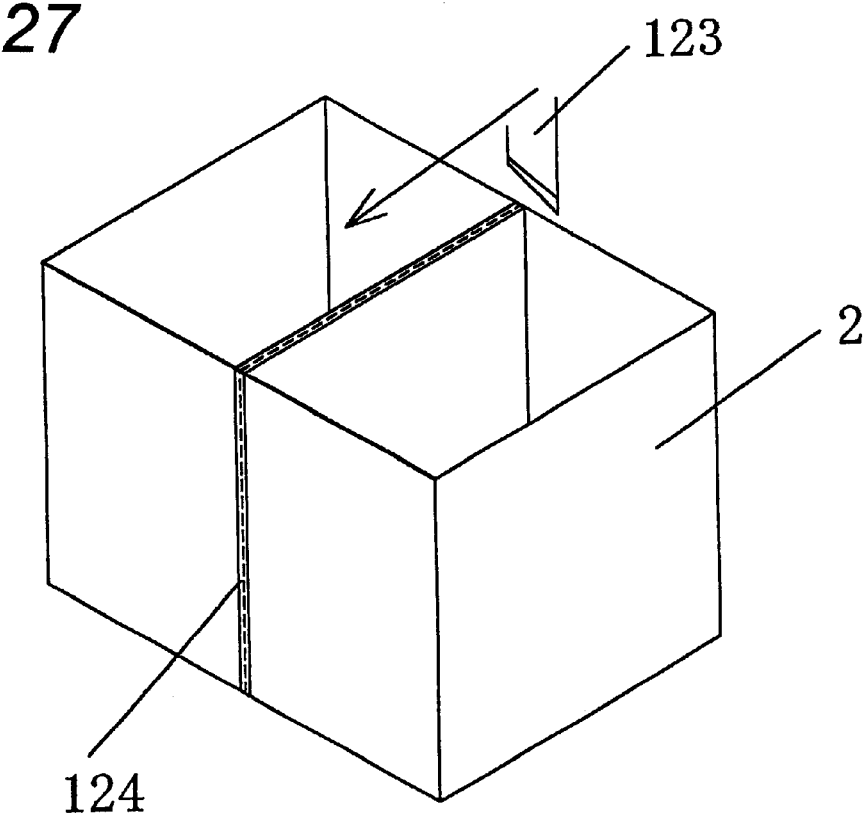
FIG. 27 is a perspective view showing one example of dismantling a container box in an empty box recovery portion shown in FIG. 19.
Figure 28:
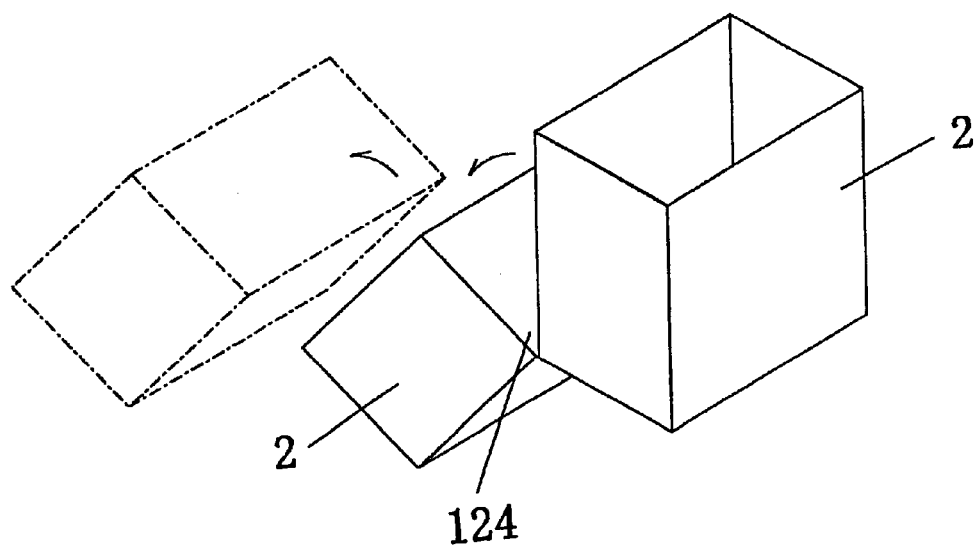
FIG. 28 is a perspective view showing another example of dismantling a container box in the empty box recovery portion shown in FIG. 19.
Figure 29:
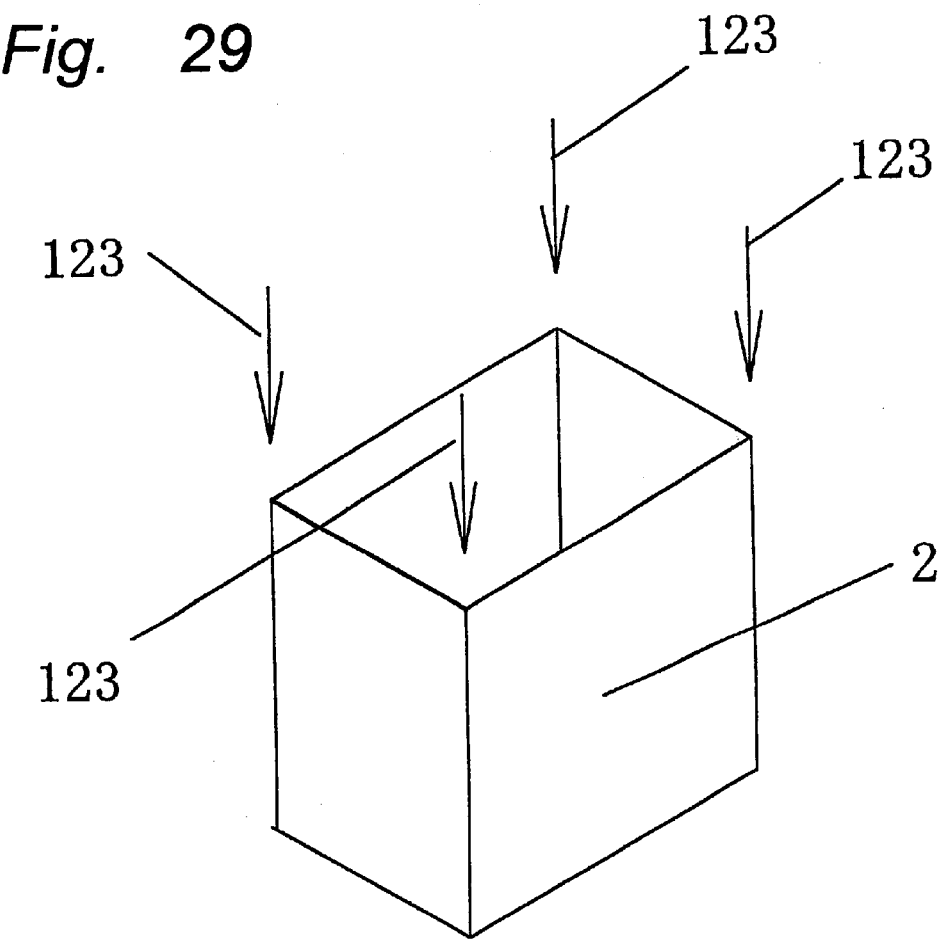
FIG. 29 is a perspective view showing another example of dismantling a container box in the empty box recovery portion shown in FIG. 19.
Figure 30:
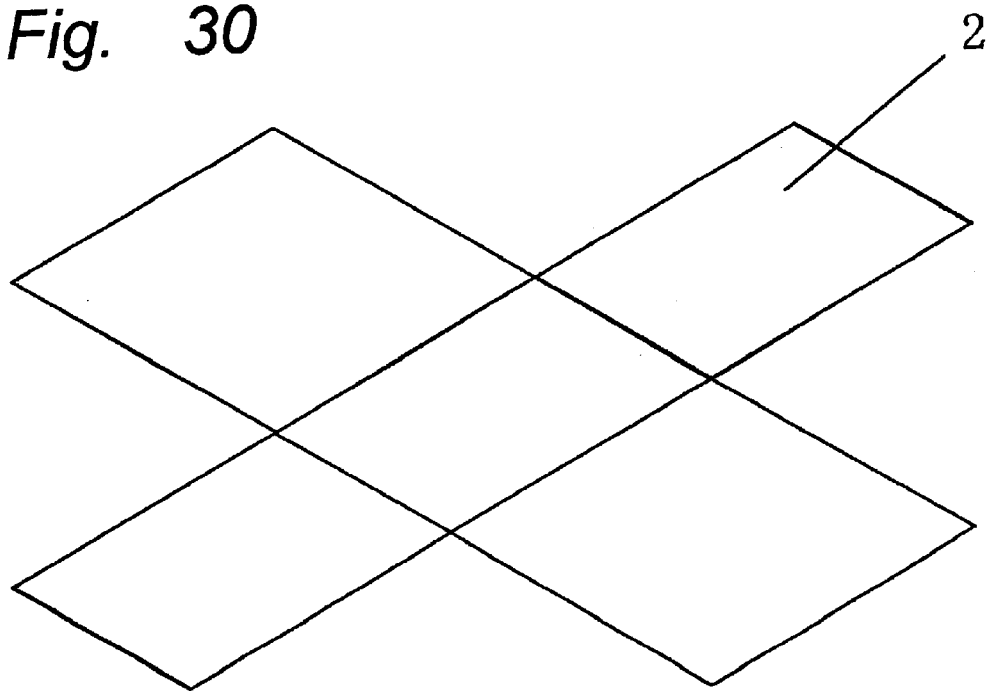
FIG. 30 is a perspective view showing a container box dismantled by the example shown in FIG. 29.

As shown in FIG. 27, the empty box recovery portion 109 is composed of a cutter 123 for cutting the container box 2 and a press mechanism for pressing the container box 2 so as to tear the container box 2 into two pieces from a perforated line 124. As shown in FIG. 28, the cutter 123 separates the container box 2, cuts four corners thereof as shown in FIG. 29, and unfolds the box so as to enable stacking as shown in FIG. 30.

Figure 26A:
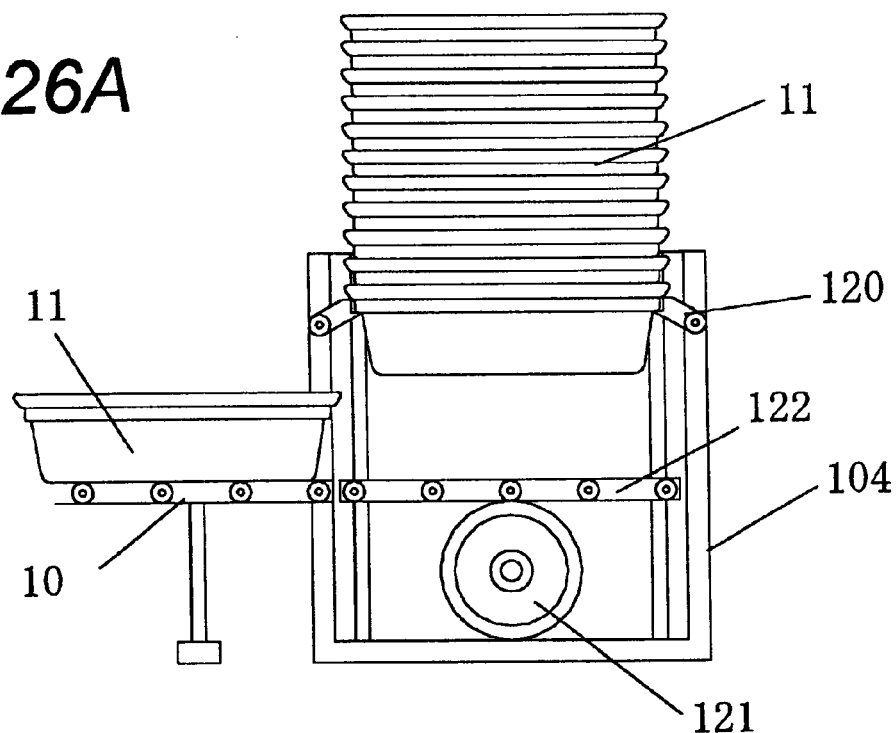
FIG. 26A is a view showing a bucket feeding device shown in FIG. 19 before operation.
Figure 26B:
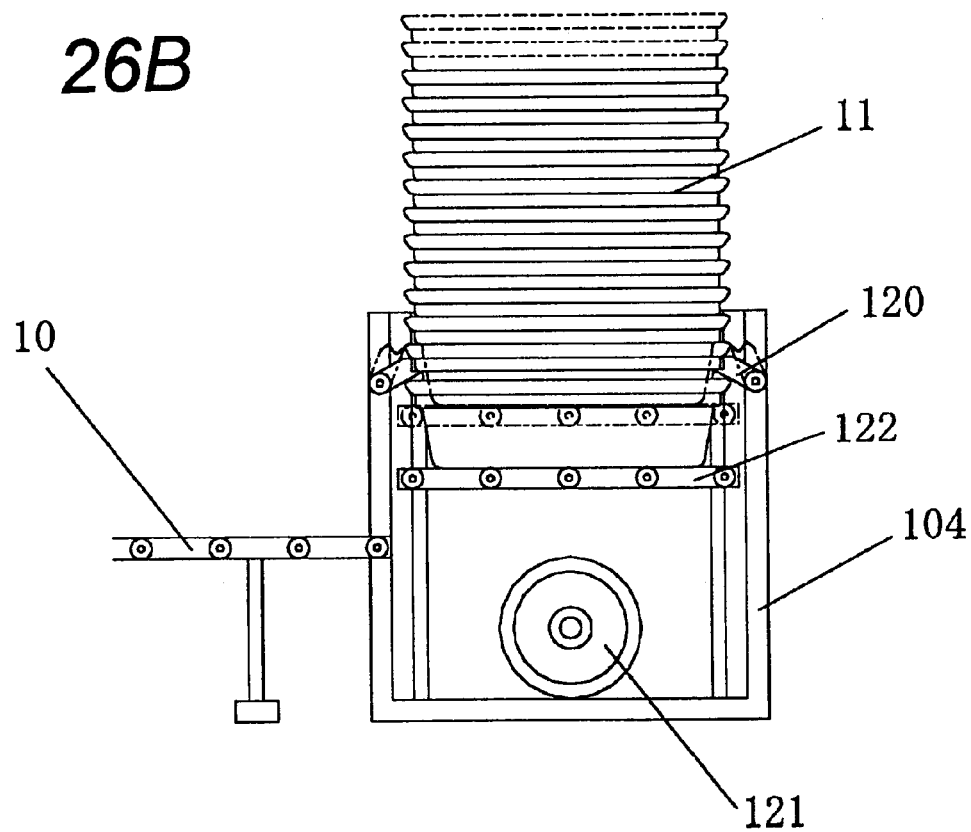
FIG. 26B is a view showing a mini-conveyer in the state of being raised from the state shown in FIG. 26A for taking out a bucket.

As shown in FIG. 26(a), in the bucket feeding device 104, stacked buckets 11 are supported by a pair of pawls 120, and only a lowermost bucket 11 is taken out by raising a mini-conveyer 122 as shown in FIG. 26(b) by driving an elevating motor 121.

On the transportation line 10, a conveyer roller 151 is provided rotatably around an axis 152. The conveyer 151 is driven via a belt 154 hung over a pulley 153 by driving an unshown motor.

In the ampoule line 185, ampoules prepared in advance in a delivery device 106 are housed in a storage container 124 fed from a container feeding device 104 to a transportation line 125, and transported to the standby station 108.

The delivery device 106 has a conventionally known structure which enables automatic feeding of a desired number of injection drugs housed in ampoule and vial per kind. The container feeding device 104 has the structure similar to the structure of the device provided on the bottle line 186.

Figure 31:
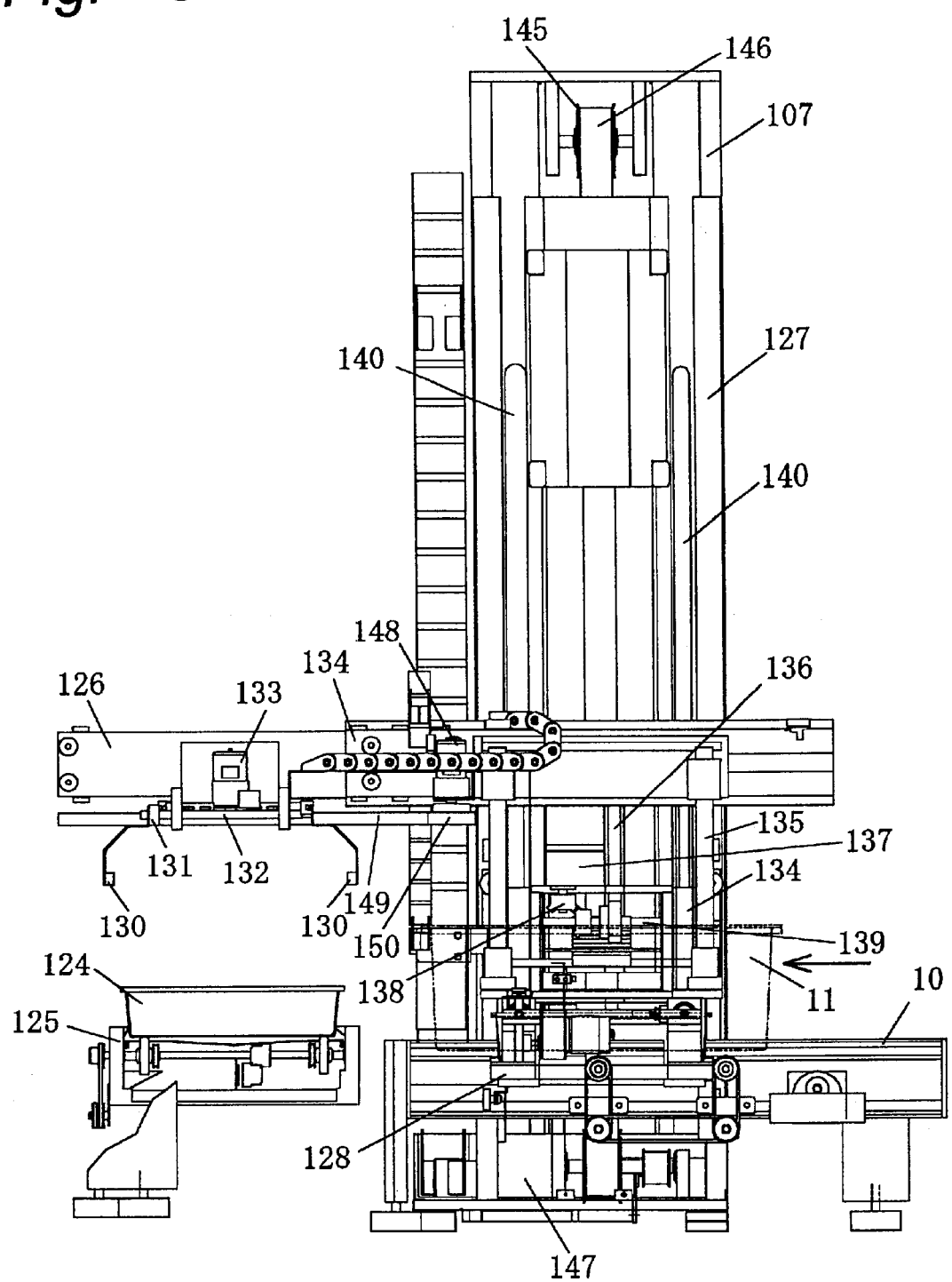
FIG. 31 is a front view showing a transfer unit shown in FIG. 19.
Figure 32:
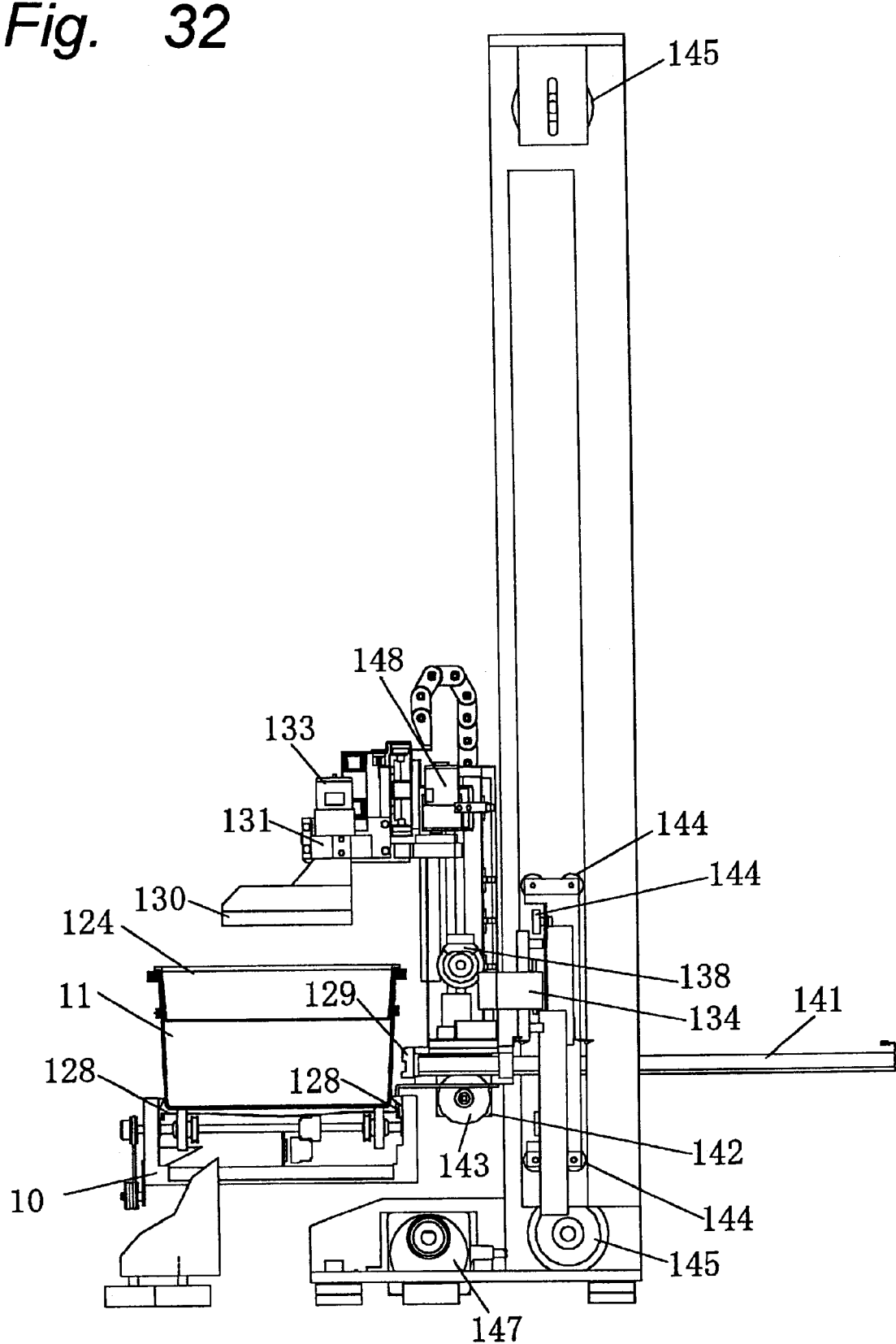
FIG. 32 is a side view of FIG. 31.
Figure 33:
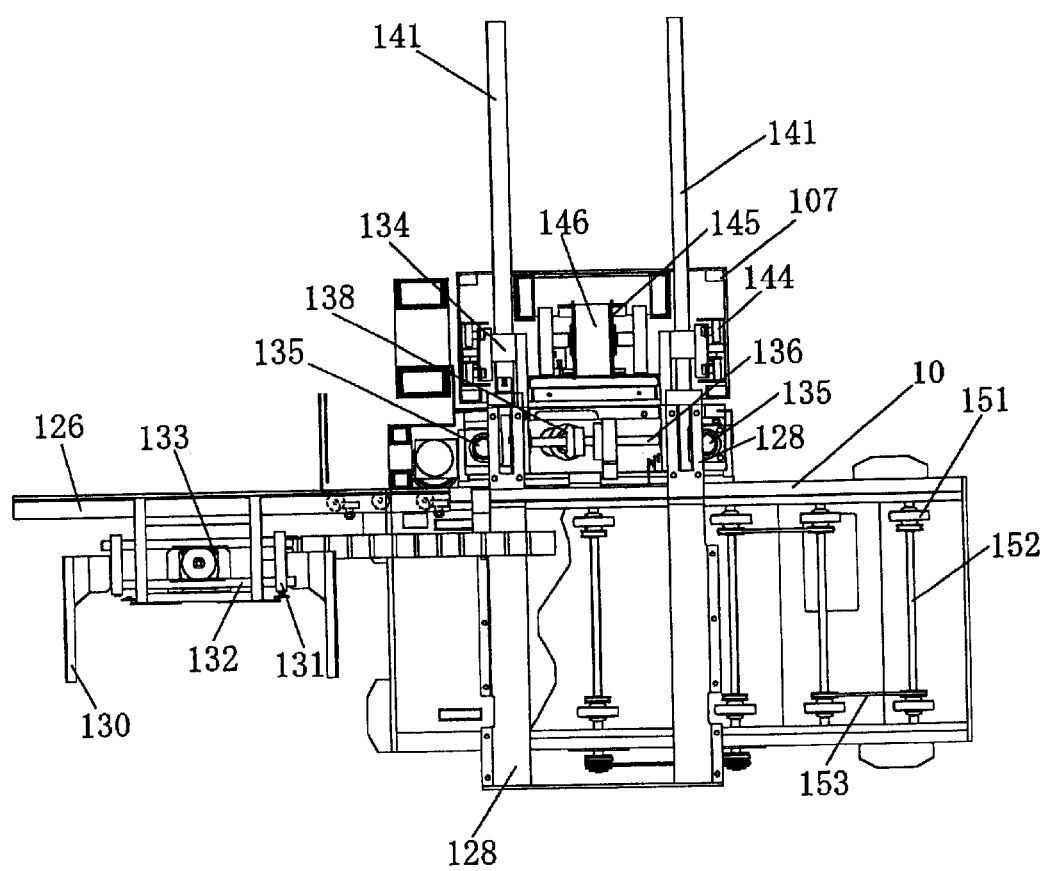
FIG. 33 is a plane view of FIG. 31.

In a transfer unit 126 as shown in FIG. 31, a clamp 130 is opened and closed by driving of a motor 133 provided on an open-close rotating bearing plate 131 via an open-close rotation axis 132.

The transfer unit 126 is mounted on a horizontal slide member 134. The horizontal slide member 134 is supported by an elevating unit 127, and is reciprocally moved in horizontal direction by driving of a motor 148 via a pinion 150 and a rack 149. The elevating unit 127 is mounted via a guide roller 144 so as to raise a bucket stacking infeed device 107 via a timing belt 146 hung over a pulley 145 by driving of a motor 147. Also, the bucket stacking infeed device 107 is provided on the lower side with a receiving unit 128 for receiving a bucket 11 in which infusion bottles from the transportation line 10 are stored. The receiving unit 128 is connected to the standby station 108. The bucket 11 in the receiving unit 128 is transported to the standby station 108 by a pressing member 129 supported by the elevating slide member 134.

Figure 34:
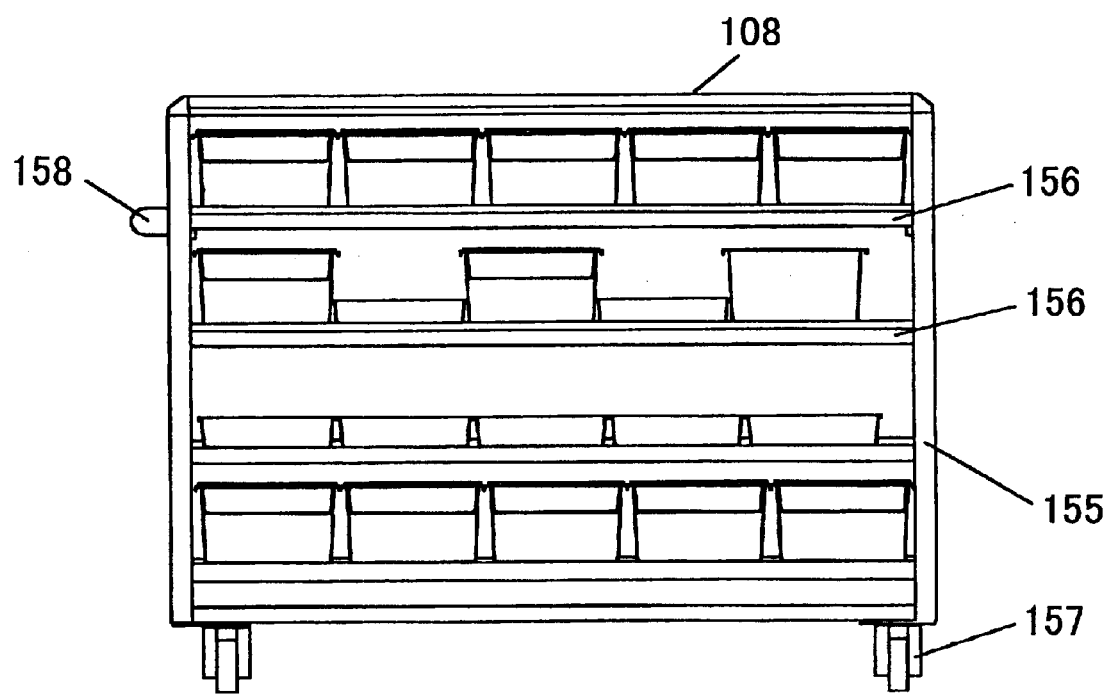
FIG. 34 is a side view showing a standby station shown in FIG. 19.
Figure 35:
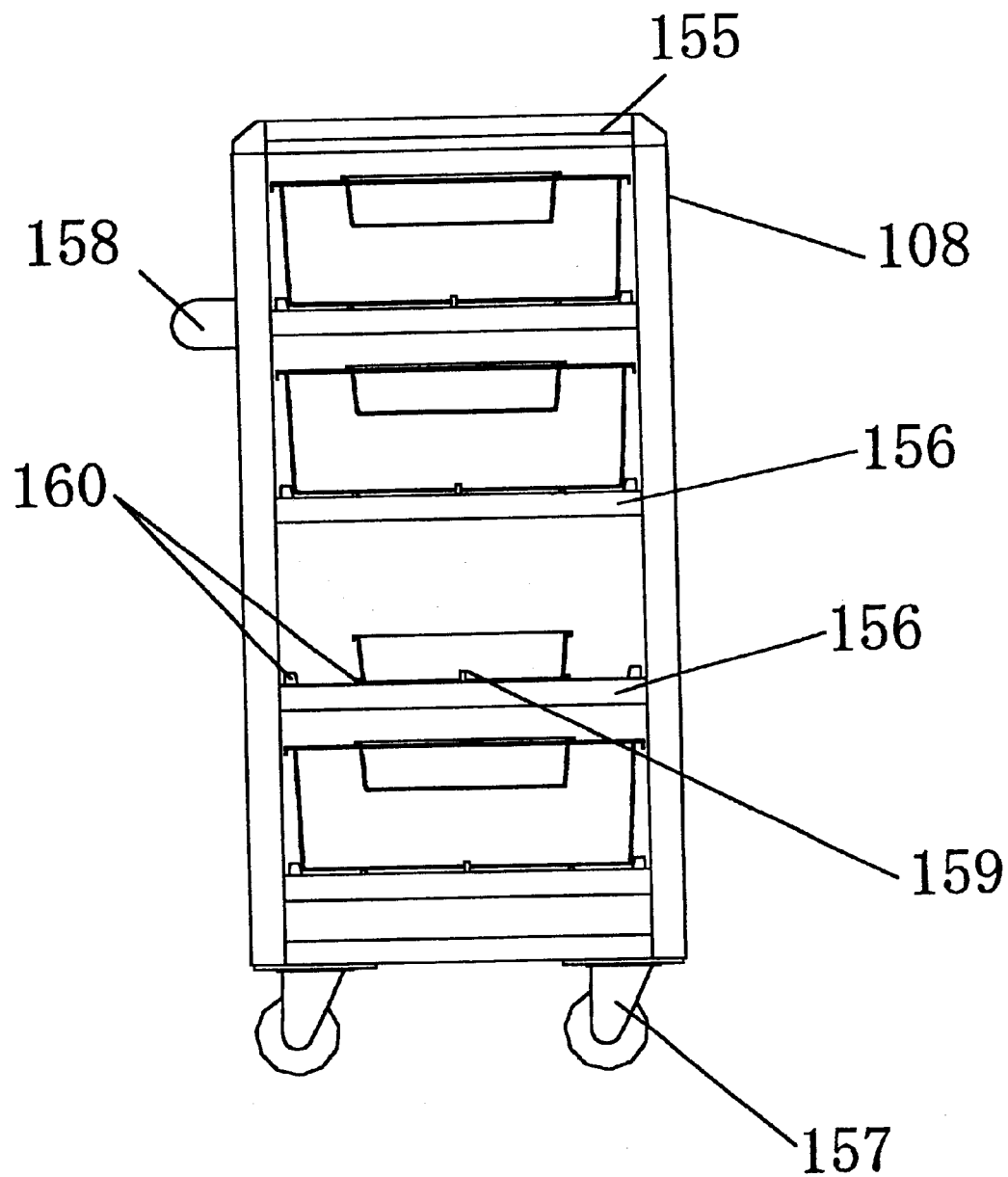
FIG. 35 is a front view of FIG. 34.
Figure 36:
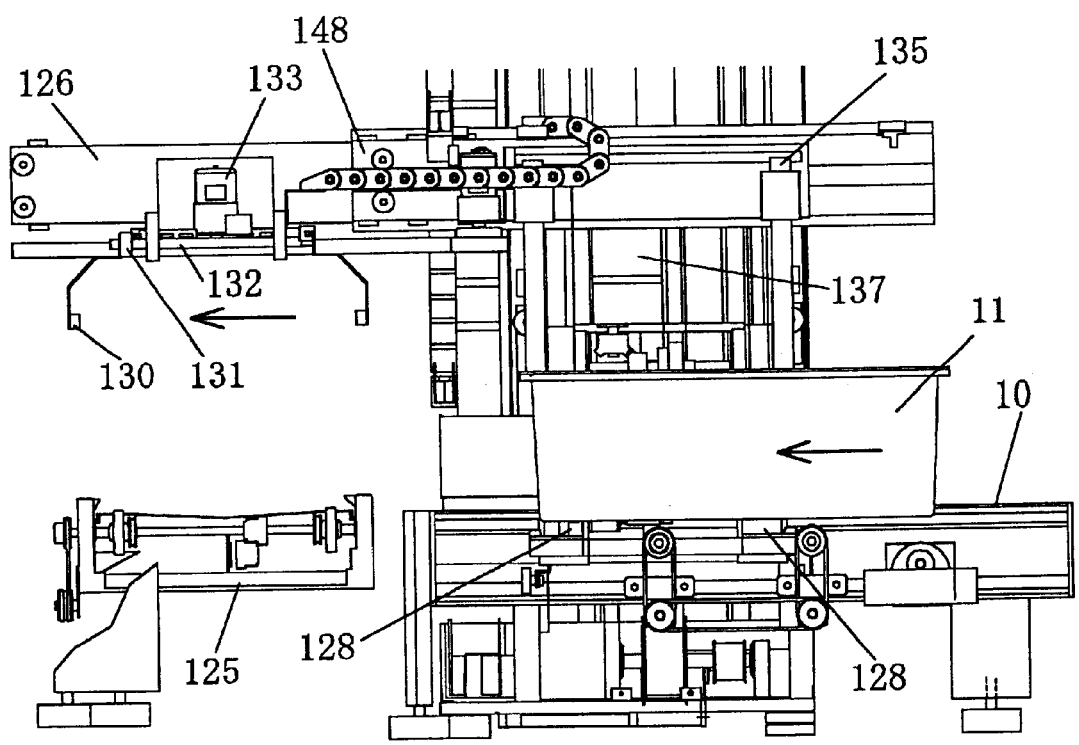
FIG. 36 is a view showing a bucket in the state of being transported from a transportation line to a receiving unit of FIG. 19.
Figure 37:
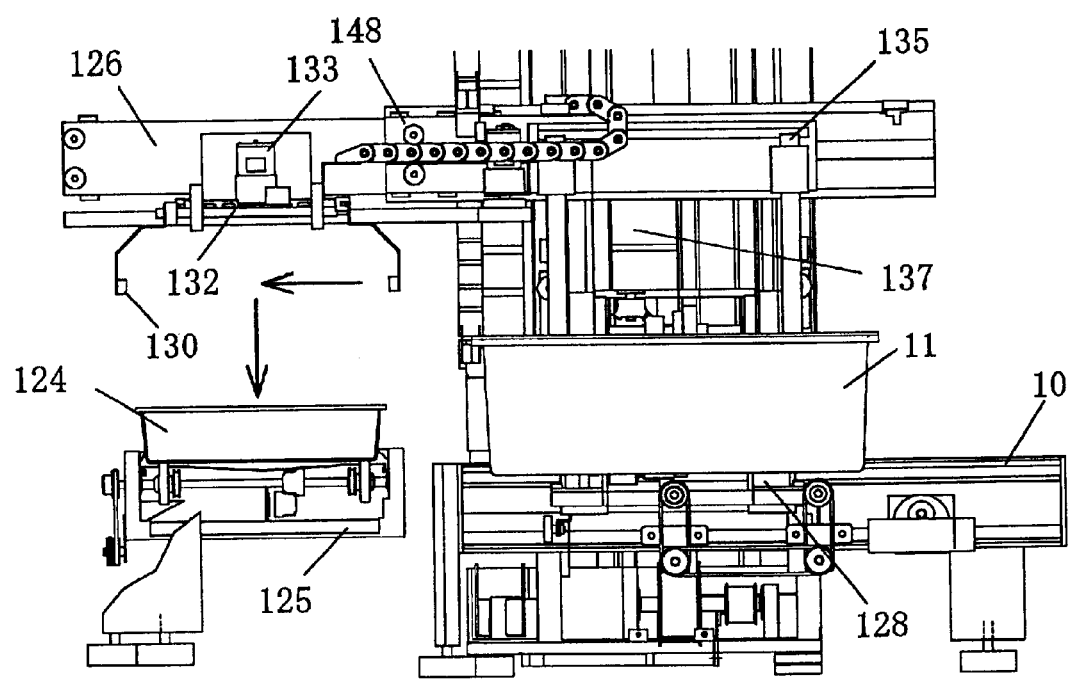
FIG. 37 is a view showing the bucket in the state of being transported from FIG. 36 to the transportation line on the side of the receiving unit.
Figure 38:
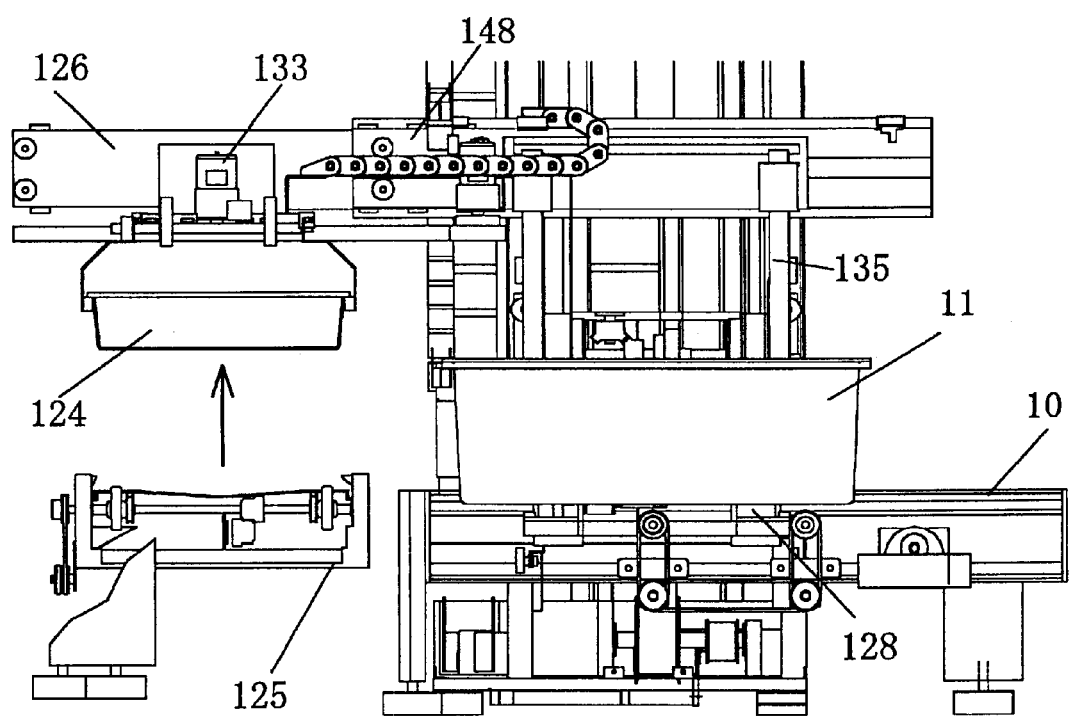
FIG. 38 is a view showing the bucket transported to the transportation line on the side of the receiving unit shown in FIG. 37 in the state of being raised by the transfer unit.
Figure 39:
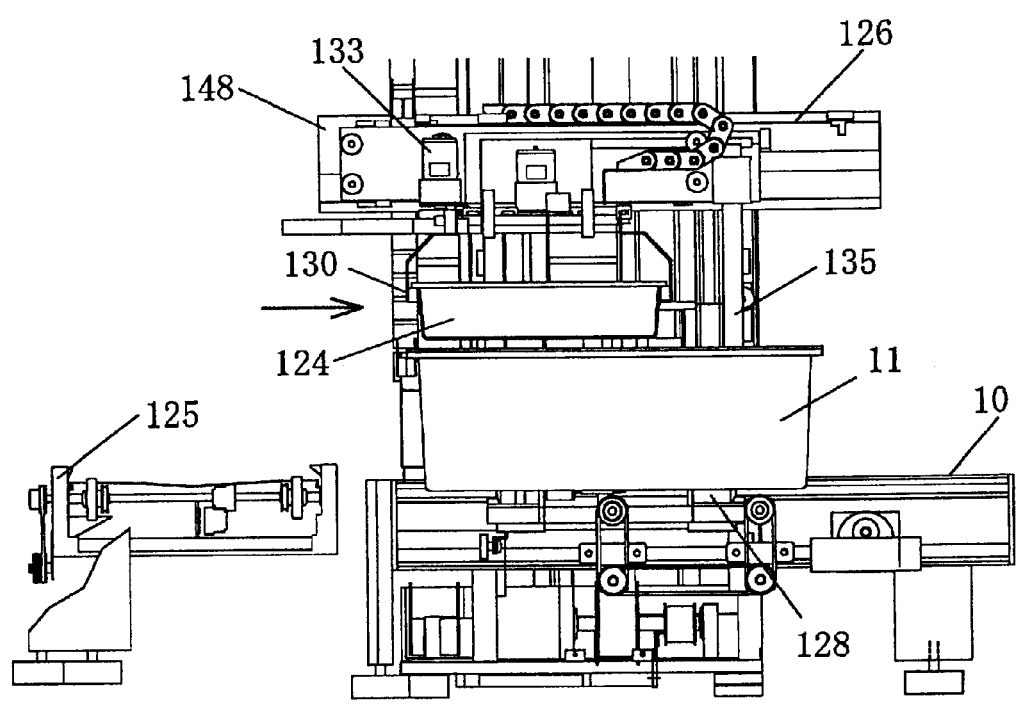
FIG. 39 is a view showing the bucket in the state of being transported from FIG. 38 to the receiving unit by the transfer unit.
Figure 40:
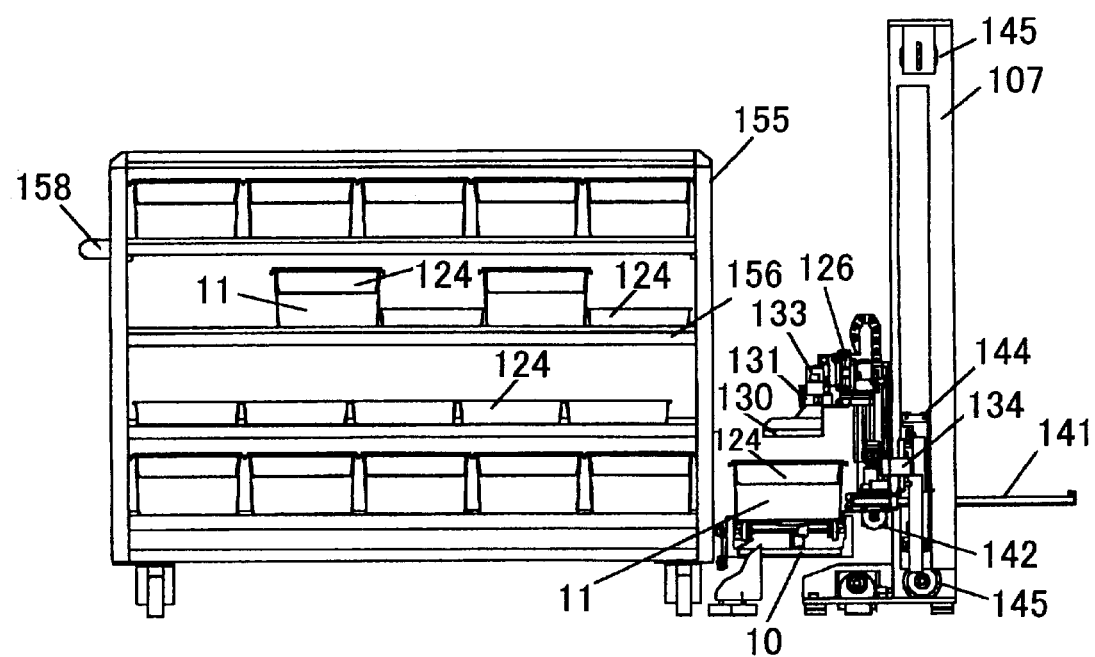
FIG. 40 is a view showing a standby station adjacent to the receiving unit of FIG. 36 or FIG. 39.
Figure 41:
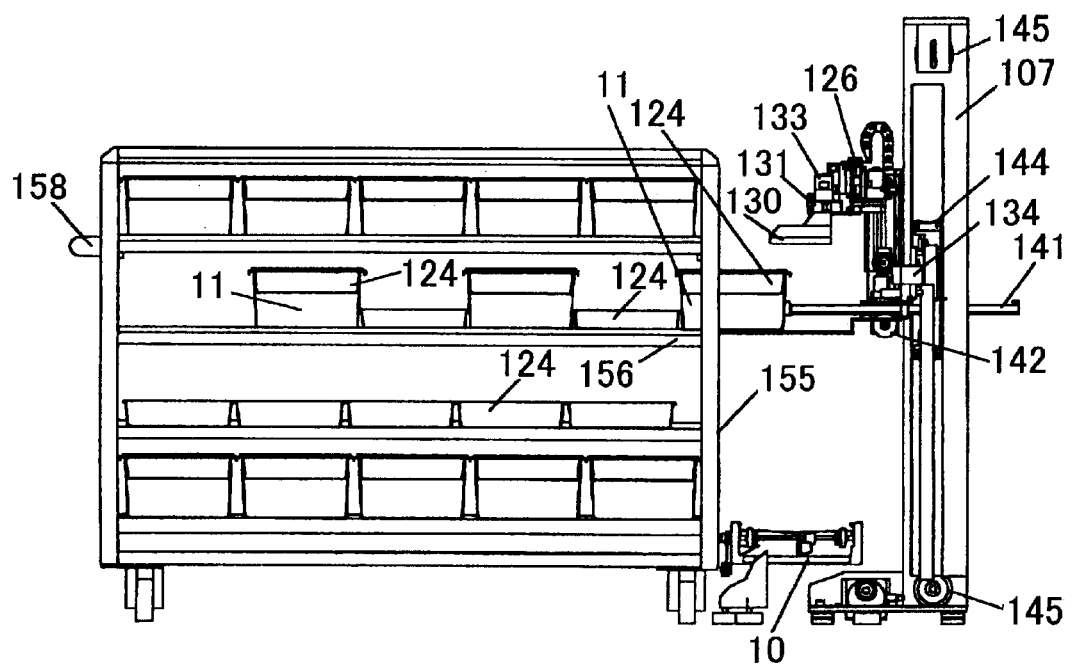
FIG. 41 is a view showing the bucket in the state of being raised from FIG. 40.

In the standby station 108 as shown in FIG. 34 and FIG. 35, a stock rack plate 156 is secured to a support frame 155. On the support frame 155, a caster 157 and a push member 158 are provided to facilitate transportation to dispensing rooms, pharmacies, or the like. Also in the stock rack plate 156, there are stocked a bucket 11 pushed by the bucket stacking infeed device 107 and a storage container 124 containing injection drugs. In the central portion of the stock rack plate 156, there are provided a reversion preventing member 159 and a guide piece 160 for straitening a bucket 11 and a container 124 in vertical direction for preventing falling of the bucket 11 and the like during moving.

Description will be made of operation of the automatic feeding device according to the fourth embodiment.

First, based on the injection drug prescription data, an injection drug targeted for automatic feeding is specified. If the injection drug is those contained in the infusion bottle 60, a container box 2 containing infusion bottles of the appropriate injection drug is fed from the automatic storehouse 100 to a transportation line 102. In the transportation line 102, first the upper face of the container box 2 is opened by the opening device 103, and the container box 2 is transferred to an appropriate infusion bottle loading device 101. In the infusion bottle loading device 101, the infusion bottles are distributed to each rack 117 by the flexible belt 118, and transported to the bucket 11 by the devices similar to the grasp portion 7 and the movement unit 8 based on the preinstalled coordinate data of the infusion bottles 60. When the container box 2 is emptied, the rack 117 is rotated to dismantle and stack the empty box by the empty box recovery portion 109 through the empty box recovery belt 119. The bucket 11 is transported from the transportation line 10 to the standby station 108. If the injection drug is ampoules and vials, the ampoules and the like are fed from the container feeding device 104 and stored in the storage container 124 fed to the transportation line 125, and then transported to the standby station 108 like the infusion bottles 60.

What is claimed is:

1. An automatically feeding device of an injection drug housing member in a container box carried in a casing based on injection drug prescription data, comprising in the casing:

grasp means capable of grasping the injection drug housing member housed in the container box;

movement means for moving the grasp means;

takeout order setting means capable of setting takeout order of injection drug housing members in the container box, and control means for driving and controlling the movement means based on coordinate data of the injection drug housing member preinstalled in a coordinate data table in a state that the container box is positioned in a specified position and the takeout order set by the takeout order setting means so as to automatically transport the injection drug housing member to a specified position after the injection drug housing member being moved to a graspable position by the grasp means and grasped by the grasp means.

2. An automatic feeding device of an injection drug housing member as defined in claim 1, wherein the takeout order setting means is composed of indication means for indicating an operation screen at least having an order column.

3. The automatic feeding device of an injection drug housing member as defined in claim 2, wherein when indication contents by the indication means are changed and installed data is duplicated thereby, a message is indicated.

4. An automatic feeding device of an injection drug housing member as defined in claim 1, wherein the injection drug housing member is an infusion bottle;

the grasp means is capable of grasping a bottleneck of the infusion bottle;

the movement means is for moving the grasp means in X, Y, and Z axis direction; and the control means is for driving and controlling the movement means based on coordinate data of each housed infusion bottle in a state that an upper face of the container box is opened so as to automatically transport the injection drug housing member to a specified position after the injection drug housing member being moved to a graspable position by the grasp means and grasped by the grasp means.

5. The automatic feeding device of an injection drug housing member as defined in claim 4, wherein the grasp means is composed of an arm pawl for grasping a bottleneck of an infusion bottle, an arm support barrel for accommodating the arm pawl to prevent expansion thereof, and a retention mechanism capable of retaining the arm pawl in a state of being accommodated in the arm support barrel.

6. The automatic feeding device of an injection drug housing member as defined in claim 4, wherein the coordinate data of each infusion bottle in the container box preinstalled in the coordinate data table includes a margin value for adjusting a grasp position by the grasp means.

7. The automatic feeding device of an injection drug housing member as defined in claim 4, wherein stock management of the infusion bottle is conducted based on number of the infusion bottles taken out from the container box and the coordinate data table.

8. The automatic feeding device of an injection drug housing member as defined in claim 1, wherein the injection drug housing member is a soft bag, and the grasp means has an elastic holding portion for holding a surface sheet of the soft bags raked up and stacked flat in the container box from both sides for grasping.

9. The automatic feeding device of an injection drug housing member as defined in claim 1, wherein there is provided a bucket for collecting an injection drug housing member carried out from the container box by the grasp means, and the control means prevents overloading of the injection drug housing member fed to the bucket by the grasp means based on a maximum loading condition determined in advance corresponding to a kind of the injection drug housing member.

10. An automatic feeding device of an injection drug housing member in a container box carried in a casing based on injection drug prescription data, comprising in the casing:

grasp means capable of grasping the injection drug housing member housed in the container box;

detecting means for detecting whether the injection drug housing member is grasped by the grasp means or not;

movement means for moving the grasp means;

an automatic storehouse for storing a plurality of the container boxes and automatically feeding an appropriate container box; and feeding means for automatically feeding appropriate injection drug housing members one by one based on coordinate data of the injection drug housing member preinstalled in the coordinate data table in a state that the container box automatically fed from the automatic storehouse is positioned in a specified position.

* * * * *